United States Patent
Kile

(10) Patent No.: US 10,215,334 B1
(45) Date of Patent: Feb. 26, 2019

(54) LUBRICATING OIL MONITORING AND MAINTENANCE CAP WITH OIL LEVEL MONITORING SYSTEM

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 112 days.

(21) Appl. No.: 15/587,148

(22) Filed: May 4, 2017

Related U.S. Application Data

(63) Continuation of application No. 15/185,750, filed on Jun. 17, 2016, now Pat. No. 9,657,898, which is a continuation of application No. 14/605,182, filed on Jan. 26, 2015, now Pat. No. 9,458,965, which is a continuation of application No. 13/666,155, filed on Nov. 1, 2012, now abandoned.

(51) Int. Cl.
*F16N 29/02* (2006.01)
*F16N 19/00* (2006.01)
*B62D 55/092* (2006.01)
*F16N 29/00* (2006.01)

(52) U.S. Cl.
CPC ......... *F16N 19/003* (2013.01); *B62D 55/092* (2013.01); *F16N 29/00* (2013.01); *F16N 2250/18* (2013.01)

(58) Field of Classification Search
CPC .... F16N 19/003; F16N 29/00; F16N 2250/18; B62D 55/092
See application file for complete search history.

(56) References Cited

U.S. PATENT DOCUMENTS

| | | | | |
|---|---|---|---|---|
| 3,089,338 A | * | 5/1963 | Glasgow | G01F 23/02 15/250.22 |
| 3,331,638 A | * | 7/1967 | Fruth | B60B 7/002 220/293 |
| 3,356,807 A | * | 12/1967 | Brown | H01H 37/34 337/1 |
| 3,593,270 A | * | 7/1971 | Walker | G01F 23/241 327/576 |
| 3,701,138 A | * | 10/1972 | Pulliam | G01F 23/247 338/25 |
| 3,798,349 A | * | 3/1974 | Thompson | H01R 4/646 174/78 |
| 3,882,967 A | * | 5/1975 | Gulla | G01F 23/247 137/389 |
| 3,893,057 A | * | 7/1975 | Beunk | H01H 37/5427 337/354 |

(Continued)

*Primary Examiner* — Michael A Riegelman
(74) *Attorney, Agent, or Firm* — Michael W. Goltry; Robert A. Parsons; Parsons & Goltry

(57) ABSTRACT

A lubricating oil reservoir has an open end closed by a cap removably coupled to the open end. The cap is formed with a sensor located in the lubricating oil reservoir. The sensor is for sensing the presence of lubricating oil that fills the lubricating oil reservoir to a recommended oil level for providing machine lubrication, and the non-presence of lubricating oil that does not fill the lubricating oil reservoir to the recommended oil level, and a signal apparatus is operatively coupled to the sensor for issuing a first stimulus in response to the sensor sensing the presence of lubricating oil for identifying a normal lubricating oil level condition, and for issuing a second different stimulus in response to the sensor sensing the non-presence of lubricating oil for identifying a low oil level condition.

16 Claims, 13 Drawing Sheets

(56) References Cited

U.S. PATENT DOCUMENTS

| | | | | | |
|---|---|---|---|---|---|
| 3,903,495 | A | * | 9/1975 | Marcoux | B60T 17/225 338/28 |
| 4,135,186 | A | * | 1/1979 | Minorikawa | G01F 23/247 340/450.3 |
| 4,299,307 | A | * | 11/1981 | Scott | F01M 11/12 184/1.5 |
| 4,491,103 | A | * | 1/1985 | Deadman | F01M 11/04 123/196 R |
| 4,522,167 | A | * | 6/1985 | Hurner | F16N 39/00 123/196 R |
| 4,572,120 | A | * | 2/1986 | Matsumoto | F01M 11/00 123/196 S |
| 4,638,288 | A | * | 1/1987 | Remec | G01F 23/0015 340/450 |
| 4,683,851 | A | * | 8/1987 | Henneberry | G01F 23/0007 123/196 S |
| 4,745,893 | A | * | 5/1988 | Atherton | G01F 23/263 123/196 S |
| 4,745,895 | A | * | 5/1988 | Seilenbinder | G01F 23/242 123/196 S |
| 4,776,089 | A | * | 10/1988 | Schoenwetter | B25B 27/14 29/758 |
| 4,879,902 | A | * | 11/1989 | Loniello | G01F 23/242 73/304 R |
| 5,046,583 | A | * | 9/1991 | Sasaki | G01F 23/242 184/108 |
| 5,066,071 | A | * | 11/1991 | Kinser | B60B 7/002 210/222 |
| 5,159,313 | A | * | 10/1992 | Kawai | F01M 11/10 123/196 S |
| 5,555,857 | A | * | 9/1996 | Kanno | F01M 11/12 123/196 S |
| 5,687,687 | A | * | 11/1997 | Trueblood | F01M 11/12 123/196 S |
| 5,861,811 | A | * | 1/1999 | Lease | G01F 23/265 340/618 |
| 6,082,737 | A | * | 7/2000 | Williamson | G01M 13/005 277/317 |
| 6,425,293 | B1 | * | 7/2002 | Woodroffe | G01F 23/0076 73/708 |
| 6,485,110 | B1 | * | 11/2002 | Lasko | F16N 19/003 180/9.1 |
| 7,134,323 | B1 | * | 11/2006 | Discenzo | G01N 33/2888 73/53.05 |
| 7,829,024 | B2 | * | 11/2010 | Izutani | F01N 11/00 204/228.6 |
| 8,230,835 | B2 | * | 7/2012 | Gibson | F01M 1/12 123/196 A |
| 9,222,840 | B1 | * | 12/2015 | Shammoh | G01K 1/026 |
| 9,228,875 | B2 | * | 1/2016 | Lingle | G01F 23/0061 |
| 2002/0085617 | A1 | * | 7/2002 | Gul | G01K 1/08 374/208 |
| 2009/0120169 | A1 | * | 5/2009 | Chandler, Jr. | G01N 9/002 73/54.41 |
| 2011/0253481 | A1 | * | 10/2011 | Lin | F16N 11/08 184/108 |
| 2012/0187751 | A1 | * | 7/2012 | Kile | B62D 55/092 305/119 |
| 2013/0320752 | A1 | * | 12/2013 | Kile | B62D 55/15 305/100 |
| 2014/0116808 | A1 | * | 5/2014 | Kile | F16N 29/02 184/108 |
| 2015/0114337 | A1 | * | 4/2015 | Marthaler | F01M 11/061 123/196 CP |
| 2015/0198578 | A1 | * | 7/2015 | Worden | F16N 29/00 73/53.05 |
| 2016/0169448 | A1 | * | 6/2016 | Holman | F04B 17/03 184/6.4 |

* cited by examiner

LUBRICATING OIL MONITORING AND MAINTENANCE CAP WITH OIL LEVEL MONITORING SYSTEM

FIELD OF THE INVENTION

The present invention relates generally to lubricating oil reservoirs for maintaining lubricating oil for providing machine lubrication, to tracked vehicles and also to maintenance caps used to cap lubricating oil reservoirs of rollers of tracked vehicles.

BACKGROUND OF THE INVENTION

A crawler-type or tracked vehicle is normally supported and propelled by an undercarriage assembly having an endless track entrained about a drive roller or sprocket, a front idler roller, a rear idler roller, and a series of track rollers. The drive roller or sprocket is driven by an engine of the work vehicle which, in turn, causes the endless track to be advanced around each of the front and rear idler rollers as well as the track rollers to advance the work vehicle.

For an endless track to function properly, it must be properly tensioned around the several rollers, and the several rollers must be properly maintained to ensure they roll with the least amount of friction while supporting the weight of the vehicle. Tracked vehicles are normally considerably heavy. As a result, the rollers are prone to generate substantial frictional heat as they are made to roll as the tracked vehicle advances. Excessive frictional heat in the rollers can lead to roller failure and expensive and time-consuming repair costs. Limiting frictional heat in rollers is accomplished with a lubricating oil for providing machine lubrication, and which is applied to and maintained by reservoirs formed in the rollers. The lubricating oil must be periodically replenished, and periodically replaced to ensure the oil functions properly, namely, that it reduces roller friction and draws and dissipates heat away from the rollers. Proper oil maintenance in rollers is essential for proper operation of the tracked vehicle and to limit unnecessary and time-consuming roller repairs, and the oil levels in the rollers must be properly maintained to prevent damage to the rollers, which can occur if the oil levels become too low.

SUMMARY OF THE INVENTION

According to the principle of the invention, an apparatus includes a lubricating oil reservoir with an open end closed by a cap removably coupled to the open end, and the cap has a lubricating oil engaging side that faces the lubricating oil reservoir and a sensor located in the lubricating oil reservoir. The lubricating oil reservoir is for holding a volume of lubricating oil for providing machine lubrication, which said volume of lubricating oil is to extend vertically upward into the lubricating oil reservoir in a direction toward the sensor and along and in direct contact with the lubricating oil engaging side of the cap so as to touch the sensor when the volume of lubricating oil is sufficient to fill the lubricating oil reservoir to a recommended oil level, and so as to not touch the sensor when the volume of lubricating oil is insufficient to fill the lubricating oil reservoir to the recommended oil level. The sensor for sensing the presence of lubricating oil in response to the sensor touching the volume of lubricating oil in the lubricating oil reservoir when the volume of lubricating oil is sufficient to fill the lubricating oil reservoir to the recommended oil level, and for sensing the non-presence of lubricating oil in response to the sensor not touching the volume of lubricating oil in the lubricating oil reservoir when the volume of lubricating oil is insufficient to fill the lubricating oil reservoir to the recommended oil level. A signal apparatus is operatively coupled to the sensor for issuing a first stimulus in response to the sensor sensing the presence of lubricating oil, and for issuing a second stimulus in response to the sensor sensing the non-presence of lubricating oil. The first stimulus is for identifying a normal lubricating oil level condition, and the second stimulus is different from the first stimulus and is for identifying a low oil level condition. The signal apparatus is an illuminated display for issuing a first state of illumination being the first stimulus, and a second different state of illumination being the second stimulus. In a preferred embodiment, the lubricating oil reservoir is formed in a roller of a tracked vehicle.

According to the principle of the invention, an apparatus includes a lubricating oil reservoir with an open end closed by a cap removably coupled to the open end, and the cap has an outer side and an opposed lubricating oil engaging side facing into the lubricating oil reservoir, a maintenance port that extends through the cap from the outer side to the lubricating oil engaging side, and a plug, which is removably coupled to the maintenance port so as to close the maintenance port. A sensor attached to the plug, and the sensor is located in the lubricating oil reservoir. The lubricating oil reservoir is for holding a volume of lubricating oil for providing machine lubrication, which said volume of lubricating oil is to extend vertically upward into the lubricating oil reservoir in a direction toward the sensor and the plug and along and in direct contact with the lubricating oil engaging side of the cap so as to touch the sensor when the volume of lubricating oil is sufficient to fill the lubricating oil reservoir to a recommended oil level, and so as to not touch the sensor when the volume of lubricating oil is insufficient to fill the lubricating oil reservoir to the recommended oil level. The sensor for sensing the presence of lubricating oil in response to the sensor touching the volume of lubricating oil in the lubricating oil reservoir when the volume of lubricating oil is sufficient to fill the lubricating oil reservoir to the recommended oil level, and for sensing the non-presence of lubricating oil in response to the sensor not touching the volume of lubricating oil in the lubricating oil reservoir when the volume of lubricating oil is insufficient to fill the lubricating oil reservoir to the recommended oil level. A signal apparatus is operatively coupled to the sensor for issuing a first stimulus in response to the sensor sensing the presence of lubricating oil, and for issuing a second stimulus in response to the sensor sensing the non-presence of lubricating oil. The first stimulus is for identifying a normal lubricating oil level condition, and the second stimulus is different from the first stimulus and is for identifying a low oil level condition. The signal apparatus is an illuminated display for issuing a first state of illumination being the first stimulus, and a second different state of illumination being the second stimulus. In a preferred embodiment, the lubricating oil reservoir is formed in a roller of a tracked vehicle.

According to the principle of the invention, an apparatus includes a lubricating oil reservoir with an open end closed by a cap removably coupled to the open end, and the cap has an outer side and an opposed lubricating oil engaging side facing into the lubricating oil reservoir, a maintenance port that extends through the cap from the outer side to the lubricating oil engaging side, and a plug, which is removably coupled to the maintenance port so as to close the maintenance port. There is a portable sensor, and an engagement assembly removably coupling the sensor to the plug. The engagement assembly includes an element of an engagement pair carried by the plug, and a complemental element of the engagement pair carried by the sensor. The sensor is located in the lubricating oil reservoir. The lubricating oil reservoir is for holding a volume of lubricating oil for providing machine lubrication, which said volume of lubricating oil is to extend vertically upward into the lubricating oil reservoir in a direction toward the sensor and the plug and along and in direct contact with the lubricating oil engaging side of the cap so as to touch the sensor when the volume of lubricating oil is sufficient to fill the lubricating oil reservoir to a recommended oil level, and so as to not touch the sensor when the volume of lubricating oil is insufficient to fill the lubricating oil reservoir to the recommended oil level. The sensor is for sensing the presence of lubricating oil in response to the sensor touching the volume of lubricating oil in the lubricating oil reservoir when the volume of lubricating oil is sufficient to fill the lubricating oil reservoir to the recommended oil level, and for sensing the non-presence of lubricating oil in response to the sensor not touching the volume of lubricating oil in the lubricating oil reservoir when the volume of lubricating oil is insufficient to fill the lubricating oil reservoir to the recommended oil level. A signal apparatus is operatively coupled to the sensor for issuing a first stimulus in response to the sensor sensing the presence of lubricating oil, and for issuing a second stimulus in response to the sensor sensing the non-presence of lubricating oil. The first stimulus is for identifying a normal lubricating oil level condition, and the second stimulus is different from the first stimulus and is for identifying a low oil level condition. The signal apparatus is an illuminated display for issuing a first state of illumination being the first stimulus, and a second different state of illumination being the second stimulus. In a preferred embodiment, the lubricating oil reservoir is formed in a roller of a tracked vehicle.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
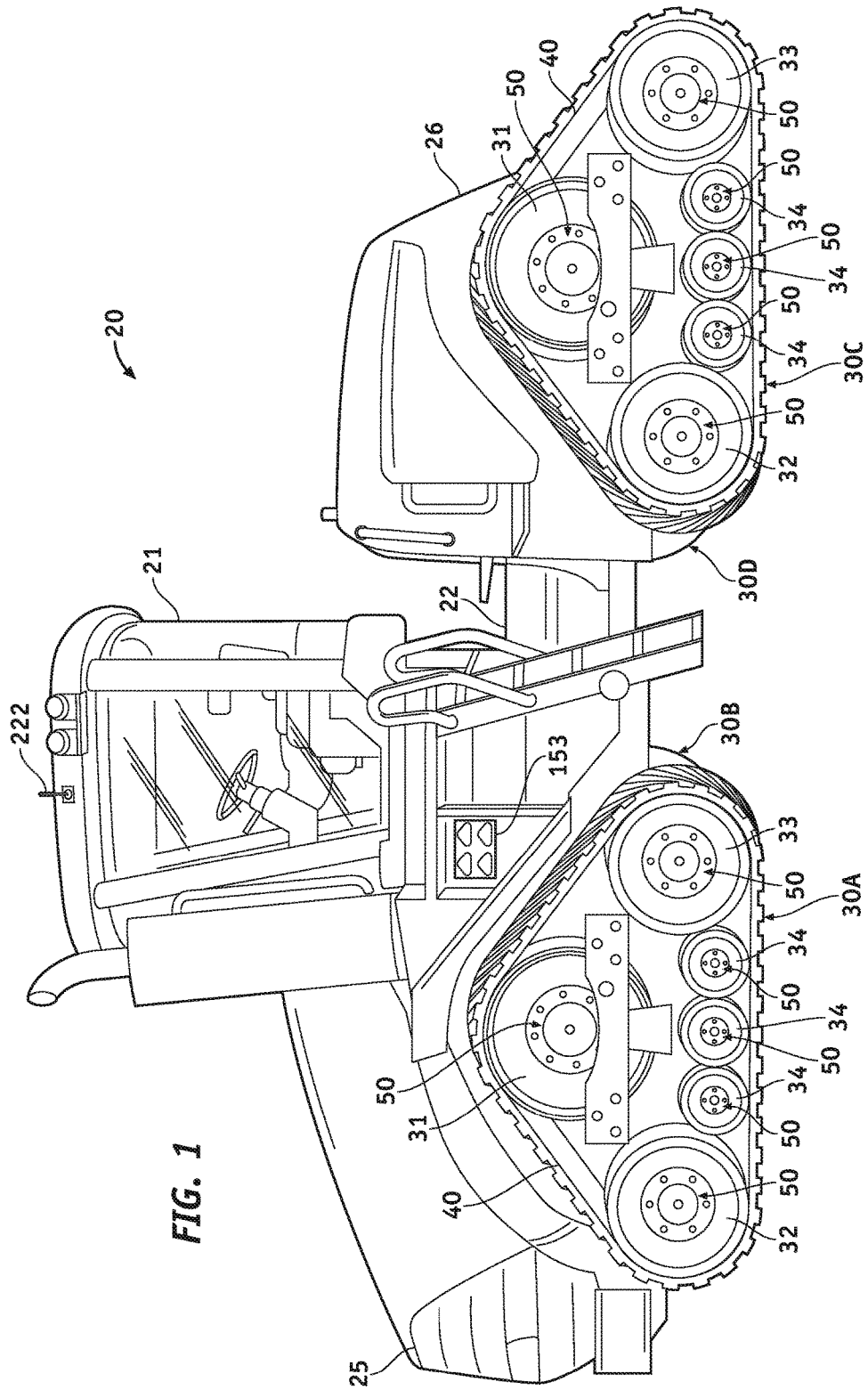
FIG. 1 is a highly generalized perspective view of a tracked vehicle.

Turning now to the drawings, in which like reference characters indicate corresponding elements throughout the several views, attention is first directed to FIG. 1 in which there is seen a tracked vehicle 20 that is exemplary of a conventional and well-known articulating tractor including an operator cab 21 supported by a chassis 22 and which is useful for drawing cultivating implements for mechanized cultivating operations as known in the art. Tracked vehicle 20 has a front or leading end denoted generally at 25 and an opposed rear or trailing end denoted generally at 26. Rear end 26 is formed with mechanical and hydraulic couplings (not shown) used to operatively couple selected cultivating implements as is known in the art. Vehicle 20 is formed with track assemblies operable for propelling vehicle 20. In the present embodiment, vehicle 20 is formed with four identical track assemblies including left front track assembly 30A, right front track assembly 30B, left rear track assembly 30C, and right rear track assembly 30D, which are secured to chassis 22 in a known manner. The track assemblies 30A-30D are known in the art and are identical and in FIG. 1 only left front and left rear track assemblies 30A and 30C are shown in detail for illustrative purposes.

With reference to left front and left rear track assemblies 30A and 30C depicted in FIG. 1, each such track assembly 30A and 30C includes an array of track rollers, including a drive track roller 31, a front idler track roller 32, a rear idler track roller 33, and minor idler track rollers 34 under drive track roller 31 and which are positioned between front and rear idler track rollers 32 and 33, as is known in the art, about which there is entrained an endless track 40. Track rollers 31, 32, 33, and 34 are identical in structure but are sized differently in the example of tracked vehicle 20 depicted in FIG. 1. In tracked vehicle 20 illustrated in FIG. 1, drive track roller 31 is larger than front and rear idler track rollers 32 and 33, which are identical in size, and front and rear idler track rollers 32 and 33 are larger than minor idler track rollers 34, which are identical in size. As is known in the art, drive track roller 31 is connected to the engine drive train (not shown) of vehicle 20 and engages endless track 40 to cause translation of endless track 40 when drive track roller 31 is rotated by the engine. As endless track 40 rotations, the various idler track rollers are caused to rotate. Drive track roller 31 may have teeth that engage within recesses in track 40. Alternatively, track 40 may have teeth that are engaged within recesses in drive track roller 31. In either configuration, drive track roller 31 can be rotated in either a clockwise or a counterclockwise direction to move vehicle 20 in either a forward direction or a reverse direction. The foregoing brief discussion of track assemblies 30A and 30C applies equally to track assemblies 30B and 30D. Vehicle 20 is driven by endless tracks 40 of the various track assemblies 30A-30D to advance vehicle 10. The specific construction of vehicle 20 is not relevant to the present invention, and the present invention may be used with any type of vehicle that is propelled using a track driven by a roller system, like that of vehicle 20.

As is known in the art, the various track rollers of the track assemblies 30A-30D of tracked vehicle 20 are identical in structure and each of them has an open end that leads to or otherwise communicates with a lubricating oil reservoir that maintains a volume of a lubricating oil for providing machine lubrication, namely, for providing lubrication to the track roller to reduce track roller friction and to draw and dissipate heat away from the track roller as is known in the art. According to the principle of the invention, each of the track rollers of each of the track assemblies 30A-30D of tracked vehicle 20 is formed with an attached cap assembly denoted generally at 50 used to close the open end to the corresponding lubricating oil reservoir. Each cap assembly 50 is a track roller-attachable unit or assembly. The cap assemblies 50 of the tracker rollers of each of the track assemblies 30A-30D are identical in structure and are sized appropriately to facilitate installation onto the open end to the lubricating oil reservoir of the corresponding track roller as described below. As a matter of example, a cap assembly 50 constructed and arranged in accordance with the principle of the invention will now be discussed in connection with track roller 31, with the understanding that the ensuing discussion of cap assembly 50 applies equally to each of the track rollers of each of the track assemblies 30A-30D.

Figure 2:
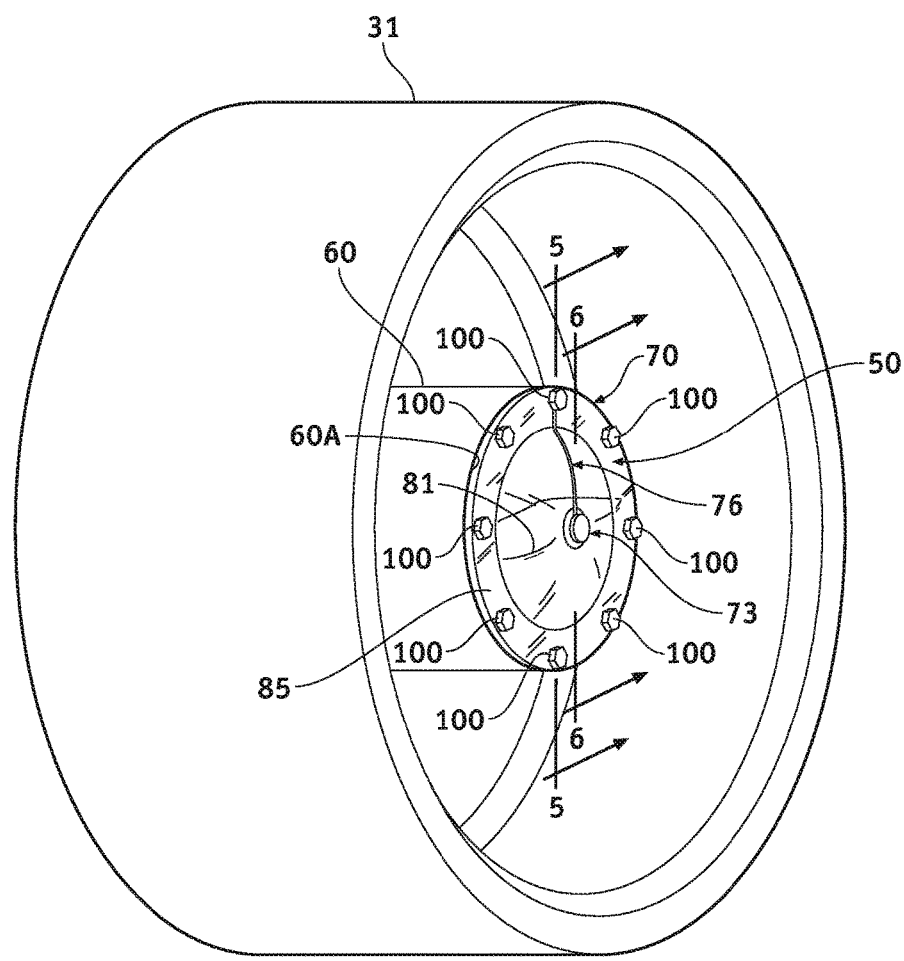
FIG. 2 is an enlarged perspective view of a track roller of the tracked vehicle of FIG. 1 shown as it would appear formed with an attachable cap assembly shown as it would appear installed capping a lubricating oil reservoir of the track roller of the tracked vehicle.

In FIG. 2 there is illustrated an enlarged perspective view of track roller 31 of tracked vehicle 20 of FIG. 1 and cap assembly 50 shown as it would appear installed to track roller 31, namely, applied to and enclosing lubricating oil reservoir 60 of track roller 31 of vehicle 20 first illustrated in FIG. 1. As is known in the art, reservoir 60 is to maintain a volume of a lubricating oil to provide machine lubrication to track roller 31 to reduce track roller friction and to draw and dissipate heat away from track roller 80 so as to ensure a proper operation of track roller 31. Cap assembly 50 is removably secured or otherwise attached to open end 60A of reservoir 60 closing open end 60A of reservoir 60 enclosing and sealing the volume of lubricating oil in reservoir 60, and also provides visual access into reservoir 60 for lubricating oil level and quality monitoring purposes.

Figure 3:
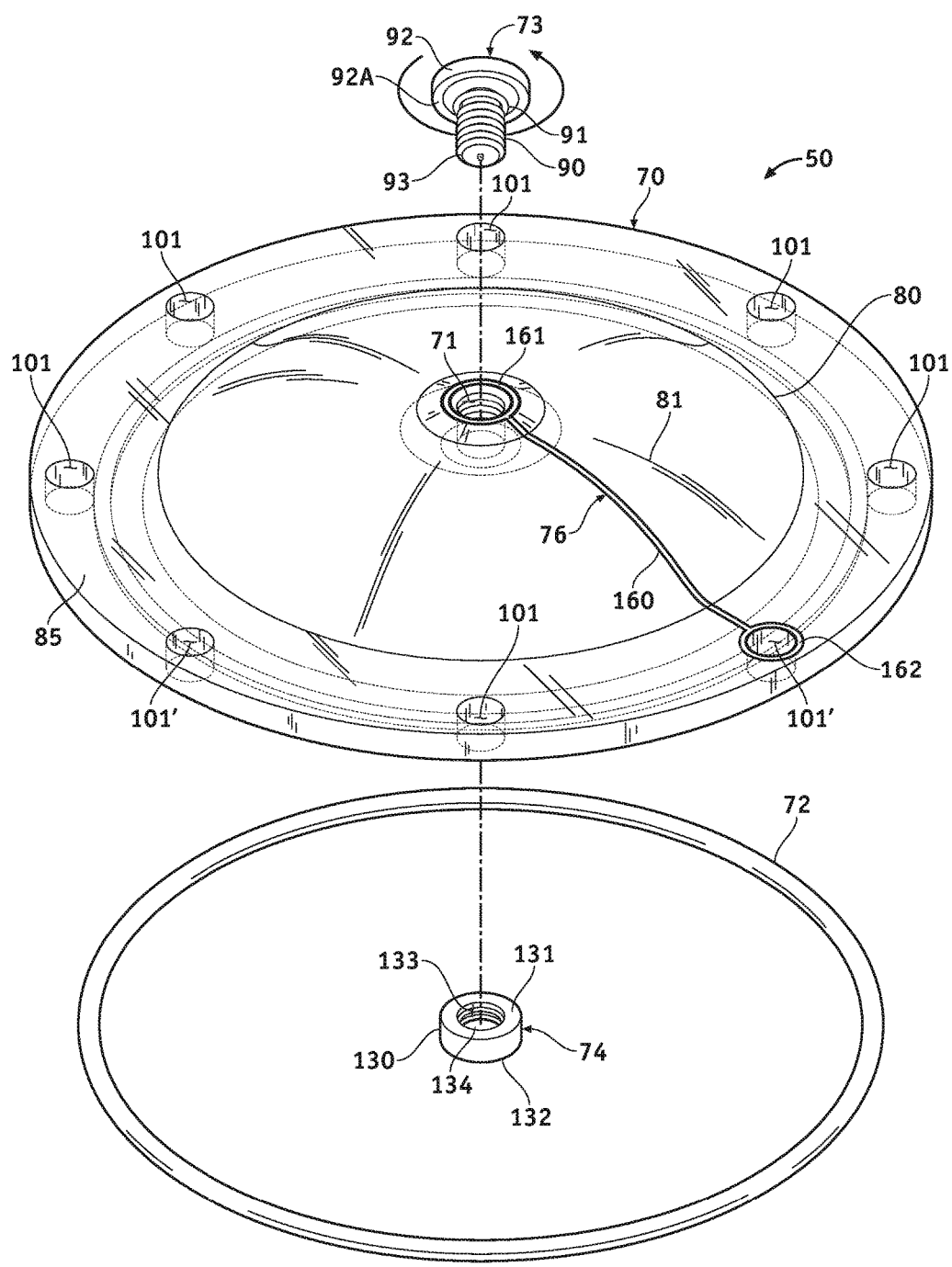
FIG. 3 is an exploded perspective view of the cap assembly of FIG. 2 including a cap formed with a lubricating oil maintenance port, a gasket, a plug used to open and close the port formed in the cap, and a sensor forming a part of an oil level monitoring system.
Figure 4:
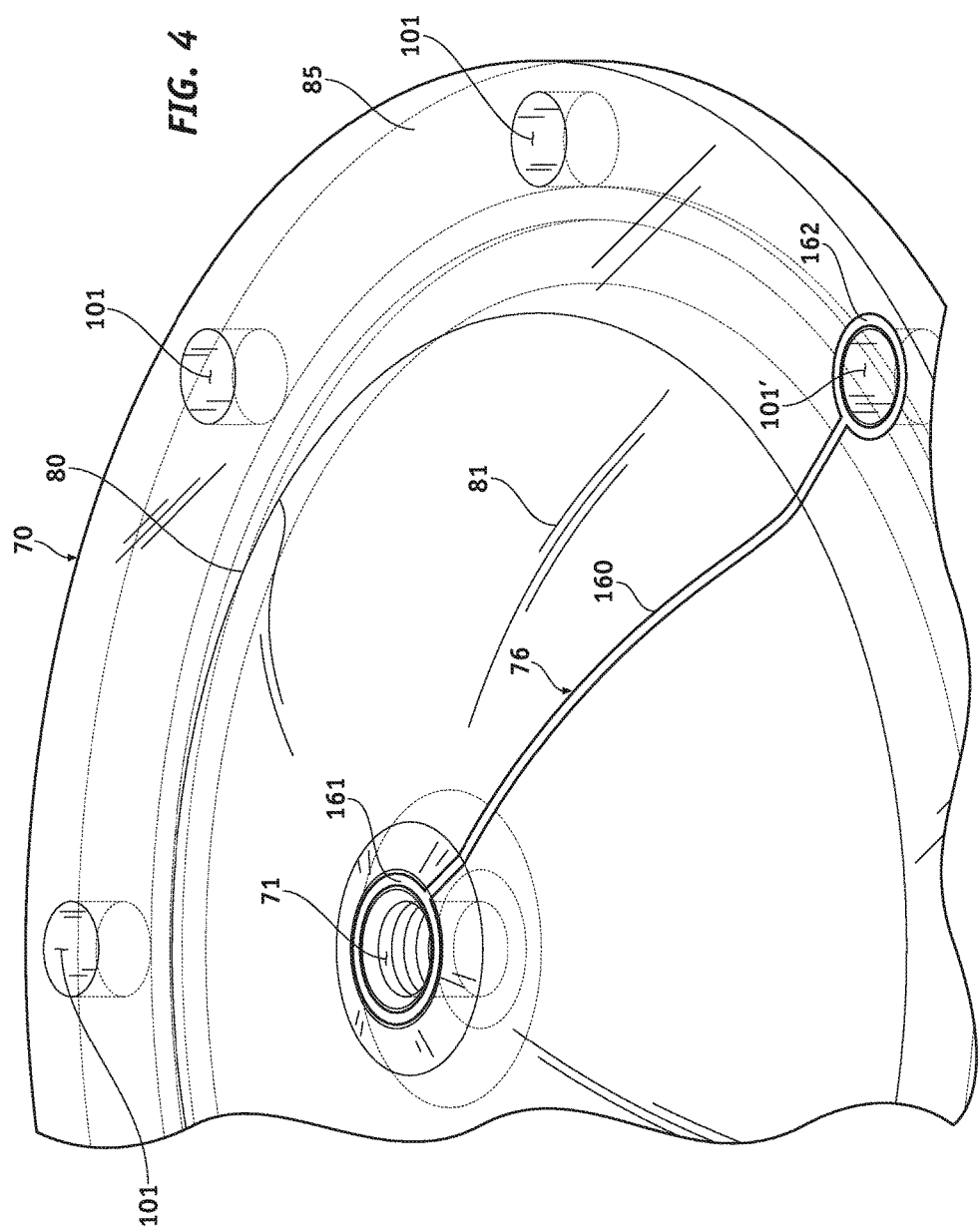
FIG. 4 is an enlarged, fragmented perspective view of the cap of FIG. 4.

FIG. 3 is an exploded perspective view of cap assembly 50 of FIG. 2, which includes a cap 70 formed with a lubricating oil maintenance port 71, a gasket 72, a plug 73 used to open and close port 71 formed in cap 70, and a sensor 74 forming a part of an oil level monitoring system constructed and arranged in accordance with the principle of the invention. FIG. 4 is an enlarged, fragmented perspective view of cap 70 of FIG. 4 illustrating a conductive trace 76 formed in cap 70, and FIG. 5 is a section view taken along line 5-5 of FIG. 2 illustrating cap assembly 50 applied to reservoir 60.

Referencing FIGS. 2-5 in relevant part, cap 70 is broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 70 is preferably formed integrally, such as by molding, or machining from a billet or other stock work-piece. Cap 70 consists of a sealing body 80, which has an outer side or face 81 and an opposed inner side or face 82 that meet at an outer perimeter extremity, which, in the present embodiment, is characterized by a circular perimeter or parametric flange 85. Sealing body 80 has a substantially uniform thickness extending between outer and inner faces 81 and 82. In the present embodiment, sealing body 80 has a thickness extending between outer and inner faces 81 and 82 in a range of approximately 7-9 millimeters.

Figure 5:
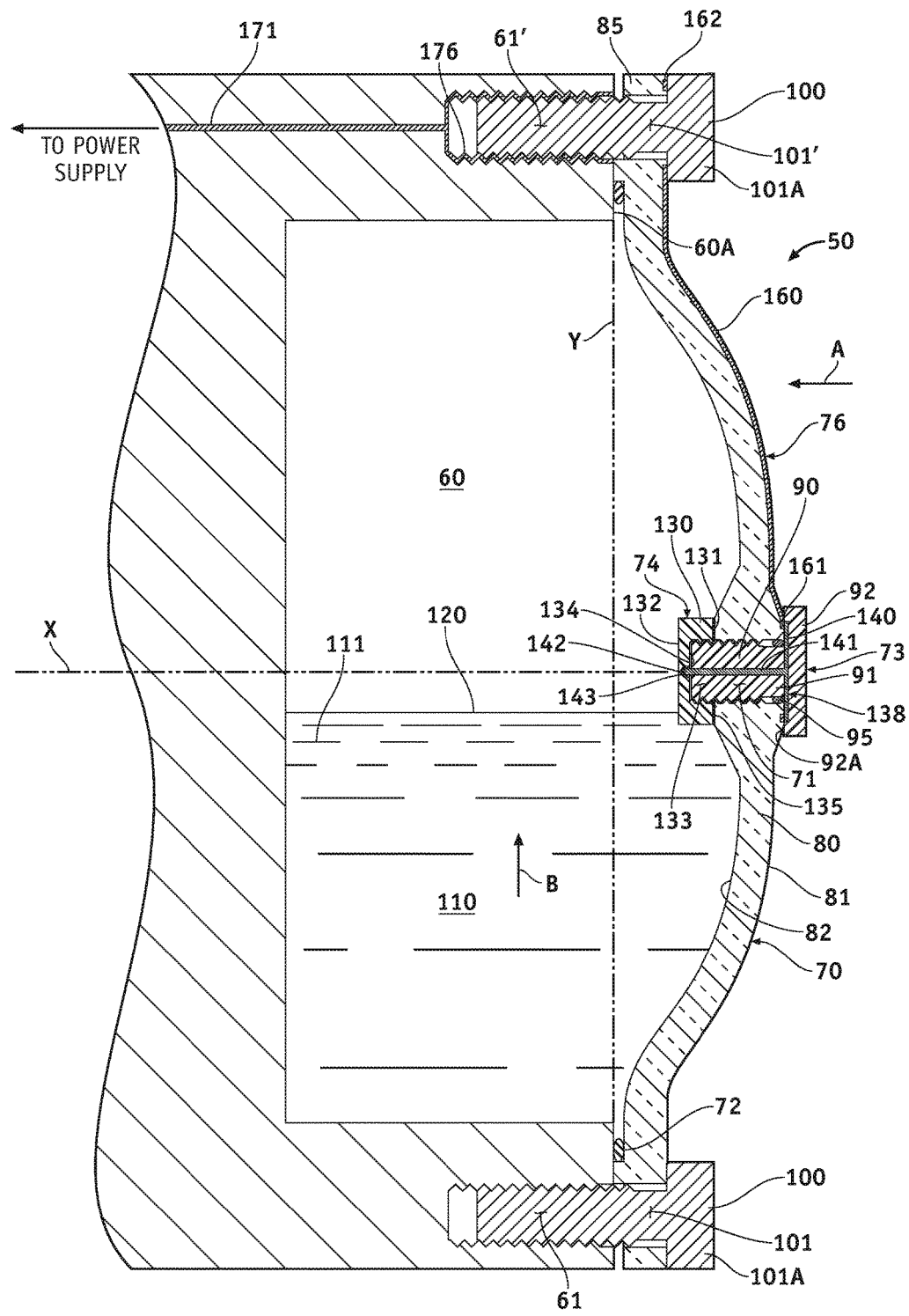
FIG. 5 is a section view taken along line 5-5 of FIG. 2.

As best seen in FIG. 5, sealing body 120 bulges outwardly from parametric flange 85, characterized in that outer and inner faces 81 and 82 are convex and concave, respectively, extending from parametric flange 85 to a geometric center of sealing body 80 formed with port 71. Port 71 is formed in sealing body 80 at the geometric center of sealing body 80 and this embodiment, and port 71 extends through sealing body 80 from outer face 81 of sealing body 80 to inner face 82 of sealing body 80.

Figure 6:
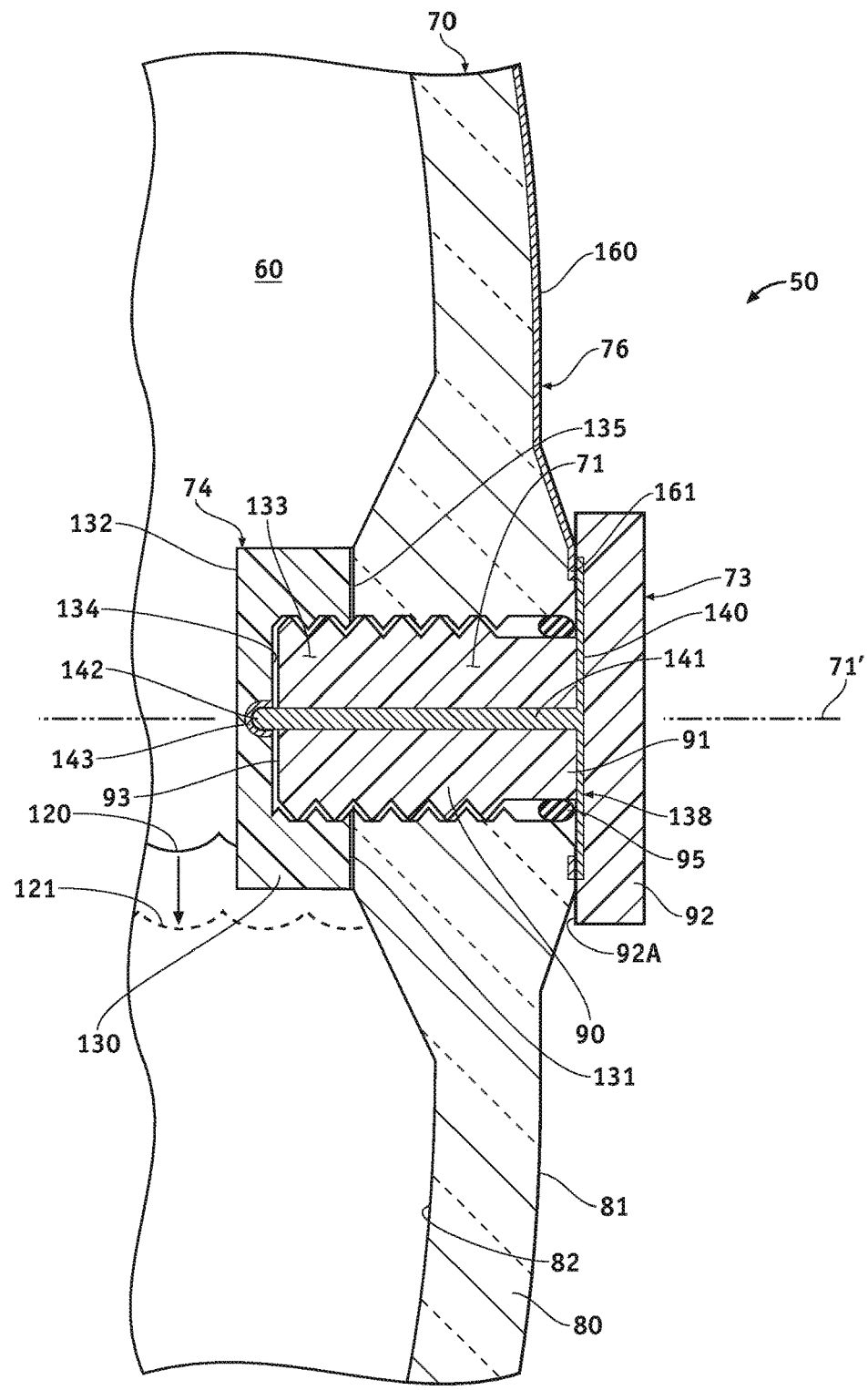
FIG. 6 is an enlarged section view taken along line 6-6 of FIG. 2.

Port 71 is adapted to receive plug 73 to close and seal port 71. With continuing reference to FIGS. 3 and 5, and looking additionally to FIG. 6, plug 71 is formed of a strong, hard, impact resistant, temperature resistant, chemical resistant, and non-conductive material or combination of materials, such as nylon or other plastic, and consists of a threaded post 90 having an outer end or extremity 91 formed with a broad, enlarged head 92, and an opposed inner end or extremity 93. Head 92 is considered part of, or otherwise an extension of, outer end or extremity 91. A gasket 95 encircles post 90 and is located along underside 92A of head 92, and post 90 relates to port 71. Plug 73 is movable between an open or a detached position detached from and opening port 71 as shown in FIG. 3 so as to provide access therethrough, such as to reservoir 60 depicted in FIG. 5 for lubricating oil replacement and replenishment purposes, and a closed or an attached position applied to and closing port 71 as shown in FIGS. 5 and 6. Port 71 is inwardly threaded, and post 90 of plug 73 is correspondingly outwardly threaded between outer end 91 and inner end 93. To apply and attach plug 73 to port 71, plug 73 is taken up, such as by hand, and applied inner end 93 first to port 71 and is threaded into port 111 through rotation and is tightened to secure plug in place tightening underside 92A of head 92 directly against outer face 81 of sealing body 80. In the closed position of plug 73 as shown in FIGS. 5 and 6, outer end or extremity 91 formed with head 92 is juxtaposed relative to the outer side or face 81 of cap 70, opposed inner end or extremity 93 is extends into volume 60 away from inner side or face 82 of cap 70 and is juxtaposed relative to the inner side or face 82 of cap 70, and gasket 95 is applied between port 71 and head 92 of plug 73 to provide a fluid-impervious seal between, one the one hand, port 71 of cap and, on the other hand, head 92 of plug 73. The application of gasket 95 between port 71 and plug 73 is known in the art and provides a fluid-impervious seal between port 71 and plug 73 to prevent lubricating oil from leaking through port 71 from reservoir 60.

FIG. 5 is a highly generalized representation of reservoir 60 formed in track roller 31 and which has open end 60A, and this is a conventional and well-known arrangement in the art of track rollers. Gasket 72 and flange 85 of cap 70 relate to open end 60A to reservoir 60. In the installation of cap assembly 50 to reservoir 60, gasket 72 is applied to open end 60A, and cap 70 is taken up and inner face 82 is directed toward open end 60A and cap 70 is then moved toward open end 60A so as to apply inner face 82 of sealing body 80 at flange 85 against gasket 72 applied to open end 60A to reservoir 60. Flange 85 is then secured in place to open end 60A closing open end 60A with cap 70, and sealing body 80 spans open end 60A of reservoir 60 and gasket 72 is applied between open end 60A of reservoir 60 and flange 85 to provide a fluid-impervious seal between sealing body 80 and open end 60A. With cap assembly 50 so installed as is known in the art, the outer side or face 81 of sealing body 80 faces away from open end 60A and opposed inner side or face 81 of sealing body 80 faces open end 60A and faces into reservoir 60.

Cap 70 is secured to open end 60A of reservoir 60 with fasteners as is known in the art, which, in the present embodiment, are bolts 100. Bolts 100 are conventional metal bolts that are preferably formed of steel, which is an electrically-conductive metal. Flange 85 is formed with spaced-apart bolt holes 101 that correspond or relate to bolt holes formed in open end 60A of reservoir 60. As a matter of illustration and reference, FIG. 5 shows two such bolt holes 61 formed in open end 60A of reservoir 60. In the application of cap assembly 50 to open end 60A of reservoir 60, bolt holes 101 of flange 85 are registered with bolt holes 61 formed in open end 60A of reservoir 60. Bolts 100 are applied to bolt holes 101 formed in flange 85 and are threaded into bolt holes 61 formed in open end 60A of reservoir 60 and are then tightened down through rotation forcibly applying bolt heads 101A of bolts 100 against outer side or face 81 of cap 70 clamping down and securing cap 70 of cap assembly in place to open end 60A as shown in FIGS. 2 and 5 while compressing gasket 72 between cap 70 and open end 60A to reservoir forming the fluid impervious seal between cap 70 and open end 60A to reservoir 60. In the present embodiment there are eight bolt holes 61 in open end 60A of reservoir 60, and there are eight corresponding bolt holes 101 in flange 85 of cap 70.

With cap assembly 50 in place to open end 60A of reservoir 60 closing open end 60A and with plug 73 installed in place in its closed position closing port 71, a volume 110 of a lubricating oil 111 is applied to reservoir 60 in the conventional manner, which prepares and readies track roller 31 for use in the normal manner in the operation of vehicle 20 of FIG. 1. As cap 70 is transparent, sealing body 80 spanning open end 60A of reservoir 60 is transparent to provide visual access therethrough in the direction indicated by arrowed line A in FIG. 5 into reservoir 60 through open end 60A for lubricating oil level and quality monitoring purposes, in accordance with the principle of the invention.

In the normal and customary operational position of track roller 31, reservoir 60 is horizontal in a direction of horizontal plane X in relation to open end 60A, which is orthogonal or otherwise vertical with respect to reservoir in a direction of vertical plane Y, and this orientation of reservoir 60 relative to open end 60A is clearly depicted in FIG. 5. In this orientation of reservoir 60 and open end 60A in which reservoir 60 extends in a horizontal direction defined by horizontal plane X and open end 60A extends in a comparatively vertical direction defined by vertical plane Y, cap 70 attached to open end 60A is vertically disposed or otherwise oriented in a direction of vertical plane Y such that sealing body 80 extends vertically upwardly in the direction of vertical plane Y and across open end 60A to reservoir 60. The volume 110 of lubricating oil 111 applied to reservoir 60 partially fills reservoir 60 and extends vertically upwardly or upward into reservoir 60 toward port 71 and plug 73 in the direction of arrowed line B in FIG. 5 and along and in direct contact with or otherwise against the inner side or face 81 of sealing body 120 to a level 120 just below port 71 and plug 73 sealing port 71 as is clearly illustrated in FIG. 5. Level 120 of volume 110 of lubricating oil 111 is a recommended oil level, which is the oil level that ensures that there is a sufficient amount or volume of lubricating oil 111 in reservoir 60 to provide track roller 31 with the necessary lubrication and heat-dissipation to ensure that tracker roller 31 functions properly or otherwise in the customary way. Because inner side or face 81 of cap 70 faces into volume 60 of track roller 31 and is in direct contact with volume 110 of lubricating oil 111 filling reservoir 60 to level 120, inner side or face 81 of cap 70 is considered to be a lubricating oil engaging side or face of cap 70.

The recommended oil level 120 of volume 110 of lubricating oil 111 ensures that track roller 31 is properly lubricated during operation as indicated above. Should volume 110 of lubricating oil 111 diminish or otherwise become at least partially depleted so as to fall below the recommended level denoted generally at 120 to a low oil level, such as the low oil level denoted generally at 121 in FIG. 6, the diminished or partially depleted volume 110 of lubricating oil 111 defining low oil level 121 is defined as an oil level that is not sufficient to properly lubricate track roller 31, which could cause track roller to fail or to become damaged. When volume 110 of lubricating oil 111 falls from recommended oil level 120 to a low oil level, such as low oil level 121, volume 110 of lubricating oil 111 should be replenished to bring volume 110 of lubricating oil 111 back recommended oil level 120 to ensure track roller 31 is properly lubricated. And so when volume 110 of lubricating oil 111 partially fills reservoir 60 to recommended oil level 120, volume 110 of lubricating oil 111 applied to reservoir 60 is sufficient to fill reservoir 60 to recommended oil level 120. Furthermore, when volume 110 of lubricating oil 111 partially fills reservoir 60 to low oil level 121, volume 110 of lubricating oil 111 applied to reservoir 60 is insufficient to fill reservoir 60 to recommended oil level 120.

According to the principle of the invention, sensor 74 of cap assembly 50 forms a part of an oil level monitoring system for sensing the presence of lubricating oil in response to sensor 74 touching volume 110 of lubricating oil 111 in reservoir 60 when volume 110 of lubricating oil 111 is sufficient to fill reservoir 60 to recommended oil level 120, for sensing the non-presence of lubricating oil in response to sensor 74 not touching volume 110 of lubricating oil in reservoir 60 when volume 110 of lubricating oil 111 is insufficient to fill reservoir 60 to recommended oil level 120, for issuing a stimulus in response to sensor 74 sensing the presence of lubricating oil so as to identify a normal or recommended lubricating oil level condition in reservoir 60 and alert an operator of vehicle 20 of such a normal or recommended lubricating oil level condition in reservoir 60, and for issuing a different stimulus in response to sensor 74 sensing the non-presence of lubricating oil so as to identify a low or un-recommended lubricating oil level condition in reservoir and alert the operator of vehicle 20 of such a low or un-recommended lubricating oil level condition in reservoir 60 to prompt the operator to replenish the volume 110 of lubricating oil 111 in reservoir in order to bring it up to recommended oil level 120 to produce a normal or recommended lubricating oil level condition in reservoir 60. The oil level monitoring system constructed and arranged in accordance with the principle of the invention is incorporated in vehicle 20 and in cap assembly 50 of track roller 31, and also in each cap assembly 50 of each tracker roller of each of track assemblies 30A-30D of vehicle. The specific details of system 150 will be discussed in connection with cap assembly 50 of track roller 31, with the understanding that the ensuing discussion of system 150 in connection with cap assembly 50 of track roller 31 applies to the cap assembly 50 of each track roller of each of track assemblies 30A-30D of vehicle 20 of FIG. 1.

Figure 7:
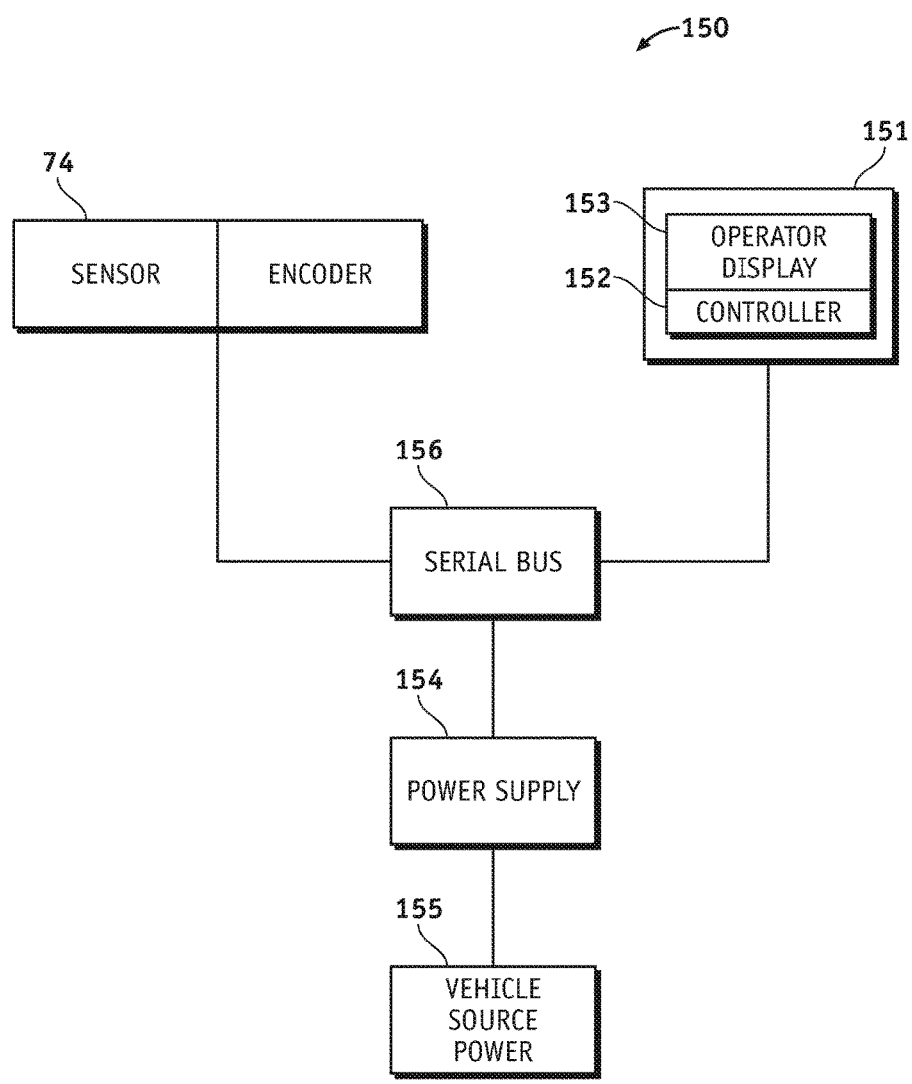
FIG. 7 is a highly generalized functional block diagram of an oil level monitoring system constructed and arranged in accordance with the principle of the invention.

FIG. 7 is a highly generalized functional block diagram of an oil level monitoring system 150 constructed and arranged in accordance with the principle of the invention, which includes sensor 74 coupled in signal communication to a signal apparatus 151 through a Universal Serial Bus (USB) 156, and a power supply 154 electrically connected between vehicle source power 155 and bus 156. In this embodiment, signal apparatus 151 consists of a controller 152 and an operator display 153. System 150 uses vehicle source power 155 in the present embodiment, which in vehicle 20 is nominally 12 volts, but may be 6 volts or 24 volts depending on the type of tracked vehicle incorporating system 150. In order to use this vehicle source power 155, power supply 154 is used to modify the voltage to a voltage compatible with system 150, which, in the present example, is nominally 9 volts.

Sensor 74 is incorporated into, and forms a part of, cap assembly 50, and is located in reservoir 60 when cap assembly 50 is assembled and installed onto track roller 31 as shown in FIG. 6. Looking to FIGS. 5 and 6, sensor 74 is applied to inner face 82 of cap 70, and is located at the geometric center of cap 70 at the region of port 71 and there it is attached to cap assembly 50 so as to be positioned or located to touch volume 110 of lubricating oil 111 when volume 110 of lubricating oil 111 is sufficient to fill reservoir 60 to recommended oil level 120, and to not touch volume 110 of lubricating oil 111 when volume 110 of lubricating oil 111 is insufficient to fill reservoir 60 to recommended oil level 120, such as when volume 110 of lubricating oil 111 fills reservoir 60 to low oil level 121.

Looking in relevant part to FIGS. 3 and 6, sensor 74 is a conventional and well-known portable touch sensor. Sensor 74 is adapted to be removably coupled to cap assembly 50, and is therefore considered to be a cap assembly-attachable sensor. More specifically, sensor 74 is configured to be removably coupled to plug 73 of cap assembly 50, and is therefore considered more specifically to be a plug-attachable sensor, wherein plug 73 and sensor 74 together form a sensor-plug assembly in accordance with the principle of the invention.

Sensor 74 is formed in the shape of a cylindrical body 130, which has opposed inner and outer ends 131 and 132. A blind bore 133 is formed in cylindrical body 130, which extends into cylindrical body 130 from inner end 131 and terminates at an end wall 134 within cylindrical body 130. Blind bore 133 is inwardly threaded and relates to outwardly threaded inner end 93 of plug 73 so as to be capable of being threaded onto inner end 93 of plug 73 to removably couple sensor 74 to plug 73. To removably attach sensor 74 to plug 73, cylindrical body 130 is threaded onto inner end 93 of plug 73 by applying inner end 93 of plug 73 to blind bore 133 and then rotating cylindrical body 130 so as to threadably secure and tighten outer end 93 of plug 73 into blind bore 133 and to draw and tighten inner end 131 of cylindrical body 130 against the area of inner face 82 of cap 70 that encircles port 71. Port 71 defines and encircles a central axis 71', about which plug 73 applied to port 71 is symmetrical and about which cylindrical body of sensor 74 applied to inner end 93 of plug 73 is also symmetrical, which allows sensor 74 to interact with the level of lubricating oil in reservoir 60 regardless of the rotational orientation of track roller 31.

In a particular embodiment, an adhesive denoted at 135 is applied between inner end 131 of cylindrical body 130 of sensor 74 and inner face 82 of cap 70, which adhesively adheres cylindrical body 130 to inner face 82 of cap 70. This allows plug 73 to be threadably removed from port 71 and sensor 74 without sensor 74 detaching and falling away from cap 71. If desired, sensor 74 may be initially adhesively applied to cap 70 with blind bore 133 aligned with port 71 as shown in FIG. 6, after which plug 73 may be threaded into port 71 and into blind bore 133 to secure plug 73 to port 71 and removably couple plug 73 to sensor 74.

Inwardly threaded blind bore 133 complements outwardly threaded inner end 93 of plug 73, which together form an engagement assembly that removably couples or attaches sensor 74 to plug 73. According to this disclosure, outwardly threaded inner end 93 of plug 73 is exemplary of an engagement element of the engagement assembly removably coupling sensor 74 to plug 73, and inwardly threaded blind bore 133 is exemplary of a complemental element of the engagement assembly removably coupling sensor 74 to plug 73. In alternate embodiments, other forms of engagement assemblies may be formed between sensor 74 and plug 73 to removably couple sensor 74 to plug 73 without departing from the invention, such as a detent engagement pair, a key engagement pair, etc.

Sensor 74 and signal apparatus 151 are electrically connected through bus 156 so as to be operatively coupled in signal communication. Bus 156 is, in turn, electrically connected to power supply 154 that is electrically connected to vehicle source power 155, and these electrical connections are made conventionally according to conventional electrical wiring techniques with conventional electrical wiring incorporated into vehicle 20 or with the existing electrical wiring of vehicle 20.

Referencing FIG. 6, plug 73 is formed with a conductor structure denoted generally at 138 including opposed conductive tracks 140 and 141, which are molded machined into plug 73. Conductive track 140 is formed of copper and is in the form of a circular disk formed in underside 92A of head 92 of plug 73 that is integral with conductive track 141 that is also preferably formed of copper and that extends centrally through threaded post 90 from conductive member 140 formed in underside 92A of head 92 to a contact 142 that protrudes outwardly from the geometric center of inner end 93 of plug 73. Contact 142 contacts and mates with a corresponding electrical contact 143 formed in endwall 134 of sensor 74 removably coupled to inner end 93 of plug 73, which electrically connects sensor 74 to conductor structure 138 formed in plug 73.

Conductive track 140 formed in underside 92A of plug 73 is applied directly against the outer side or face 81 of cap 70 and electrically contacts conductive trace 76 formed in cap 70 when plug 73 is secured to port 71, which electrically connects conductive trace 76 to conductor structure 138 formed in plug 73 and also sensor 74 electrically connected to conductor structure 138 of plug 73. Referencing FIGS. 3-6 in relevant part, conductive trace 76 is formed on outer side or face 81 of cap 70 between port 71 and one of the bolts holes 101 formed in flange 85, and this bolt hole is denoted at 101' in FIGS. 3-5 for clarity. Conductive trace 76 is preferably formed of copper and consists of an elongate conductive track 160 formed between a circular conductive track 161 that circumscribes the outer opening to port 71 and an opposed circular conductive track 162 that circumscribes the outer opening to bolt hole 101'. Conductive track 140 formed in underside 92A of plug 73 contacts circular conductive track of conductive trace 76 when plug 73 is secured to port 71, which electrically connects conductive trace 76 to conductor structure 138 formed in plug 76 and to sensor 74 applied to inner end 93 of plug 73.

In the installation of bolt 100 to bolt hole 101', the head 101A of bolt 100 is received directly against outer side or face 81 of cap and circular conductive track 162 formed at bolt hole 101', which electrically connects conductive trace 76 to bolt 100. The bolt hole 61 aligned with bolt hole 101' of cap 73 in FIG. 5 is denoted at 61' for clarity, and is lined with a conductive liner 170 formed preferably of copper and which electrically connects bolt 100 when bolt 100 is applied through bolt hole 101' and is threaded into bolt hole 61'. Conductive liner 170 is electrically connected to a conductive wire 171 formed in track roller 31, and this wire 171 is, in turn, electrically connected to bus 156 referenced in FIG. 7. And so conductive wire 171 electrically connects bus 156 to conductive liner 170 formed in bolt hole 61', conductive liner 170 electrically connects bolt 100 applied to bolt hole 61' and bolt 100 applied to bolt hole 61' electrically connects conductive trace 76 at circular conductive track 162 relating to bolt hole 101', conductive track 140 of the conductor structure of plug 73 applied to port 71 electrically connects conductive trace 76 at circular conductive track 161 relating to port 71, and conductive track 141 of plug electrically connects sensor 74 applied to inner end 93 of plug 73. This described "hard" or "wired" electrical connecting architecture forms an electronic coupling between sensor 74 and bus 156 of system 150, which is powered by power from power supply 154 that, in turn, is powered by vehicle source power 155, in accordance with the principle of the invention.

Bus 156 operatively couples sensor 74 to signal apparatus 151 so as to couple signal apparatus 151 in electrical and signal communication to sensor 74. In the operation of system 150 in reference in relevant part to FIGS. 6 and 7, sensor 74 of cap assembly 50 senses the presence of lubricating oil in response to sensor 74 touching volume 110 of lubricating oil 111 in reservoir 60 when volume 110 of lubricating oil 111 is sufficient to fill reservoir 60 to recommended oil level 120, and senses the non-presence of lubricating oil in response to sensor 74 not touching volume 110 of lubricating oil in reservoir 60 when volume 110 of lubricating oil 111 is insufficient to fill reservoir 60 to recommended oil level 120, such as when the oil level in reservoir 60 falls out of contact with sensor, such as to low oil level 121 as denoted in FIG. 6. In response to sensor 74 sensing the presence of lubricating oil, sensor 74 issues a normal-mode signal to signal apparatus 151 through bus 156. In response to receiving this normal-mode signal, signal apparatus 151 is responsive and issues a normal-mode stimulus for identifying a normal lubricating oil level condition in reservoir 60 of track roller 31. The normal-mode stimulus for identifying a normal lubricating oil level condition in reservoir 60 is designed to alert or inform an operator of vehicle 20 of such a normal lubricating oil level condition in reservoir 60 to indicate to such an operator that the track roller 31 has the recommended or sufficient volume of lubricating oil to properly lubricate track roller 31. In response to sensor 74 sensing the non-presence of lubricating oil, sensor 74 issues a low-mode signal to signal apparatus 151 through bus 156. In response to receiving this low-mode signal, signal apparatus 151 is responsive and issues a low-mode stimulus for identifying a low lubricating oil level condition in reservoir 60 of track roller 31. The low-mode stimulus for identifying a low lubricating oil level condition in reservoir 60 is designed to alert or inform an operator of vehicle 20 of such a low lubricating oil level condition in reservoir 60 to indicate to such an operator that the track roller does not have the recommended or sufficient volume of lubricating oil to properly lubricate track roller 31.

Signal apparatus 151 is a vehicle attached unit in that it is attached to vehicle 20 of FIG. 1 at a location so as to be readily accessible by an operator of vehicle 20. In vehicle 20, signal apparatus 151 is attached to the body of vehicle 20 below operator cab 21 so as to be viewable from outside of vehicle 20. This location for signal apparatus 151 is set forth as a matter of illustration and reference, and it is to be understood that signal apparatus 151 may be installed at other locations on vehicle 20 to permit it to be accessed by an operator of vehicle 20. If desired, signal apparatus 151 can be installed inside operator cab 21 of vehicle 20 to allow it to be easily accessed by an operator operating vehicle from within operator cab 21.

Signal apparatus 151 includes a controller 152 and an operator display 153 as referenced in FIG. 7. Operator display 153 is configured to issue normal-mode and low-mode stimuli to alert or inform an operator of vehicle 20 of normal and low lubricating oil conditions of track roller 31 of track assembly 30A and also the track rollers of the other track assemblies 30B, 30C, and 30D.

Figure 8:
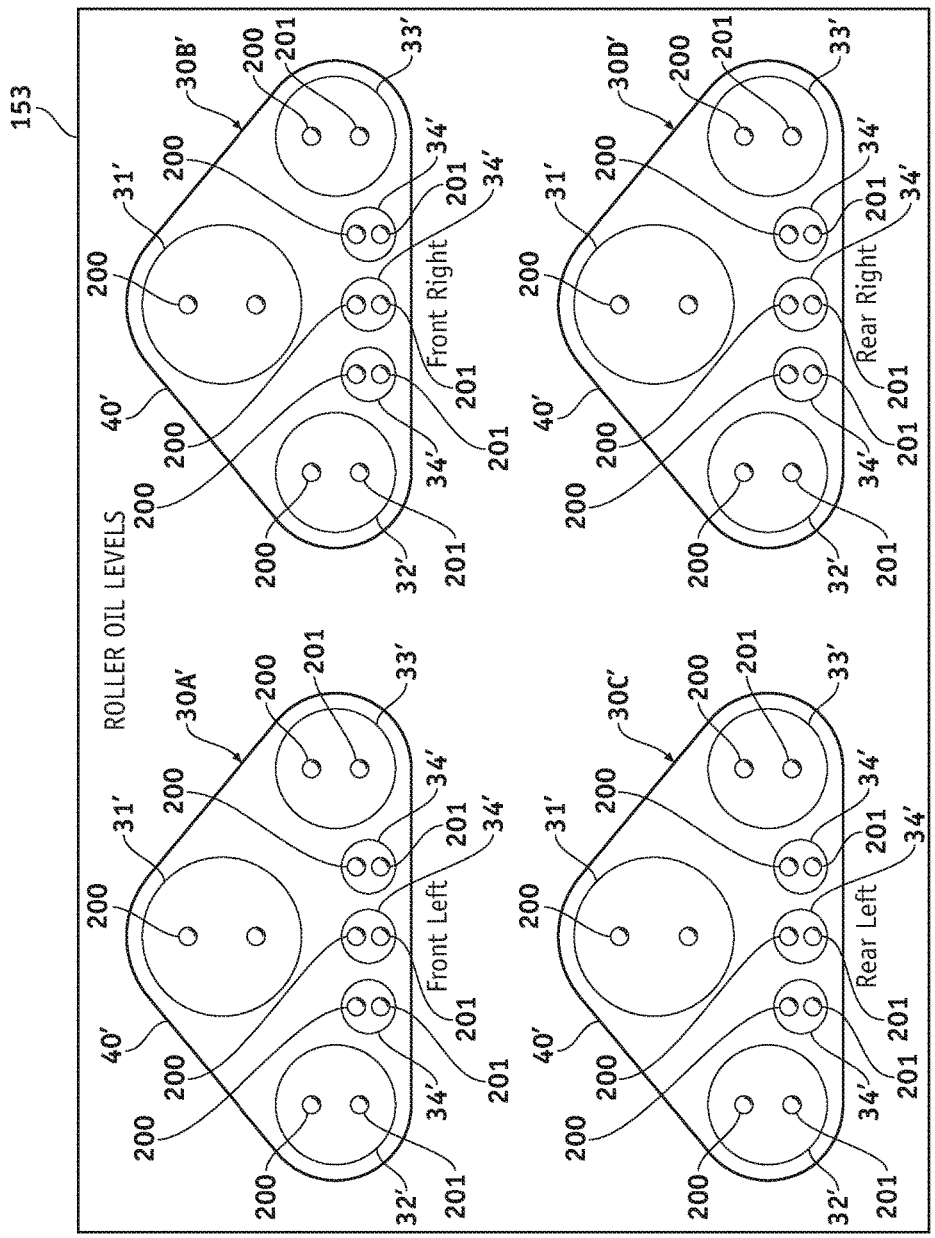
FIG. 8 is illustrative of an operator display of the oil level monitoring system of FIG. 7.

A pictorial representation of operator display 153 is shown in FIG. 8. Display 153 includes graphical representations of track assemblies 30A-30D of vehicle 20, including graphical representation 30A' of left front track assembly 30A of vehicle 20, graphical representation 30B' of right front track assembly 30B of vehicle 20, graphical representation 30C' of left rear track assembly 30C of vehicle 20, and graphical representation 30D' of right rear track assembly 30D of vehicle 20. Display 153 is preferably an illuminated display, such as an instrument cluster, and graphical representations 30A'-30D' of display 153 are illuminated representations that relate to track assemblies 30A-30D of vehicle 20. Graphical representations 30A'-30D' visually represent the corresponding track assemblies 30A-30D and include display elements that graphically and visually represent the layout and arrangement the corresponding endless track 40 and track rollers 31-34 of the various track assemblies 30A-30D. The display elements of each of the graphical representations 30A'-30D' include endless track display element 40' corresponding to an endless track 40, a drive track roller display element 31' corresponding to a drive track roller 31, a front idler track roller display element 32' corresponding to a front idler track roller 32, a rear idler track roller display element 33' corresponding to a rear idler track roller 33, and minor idler track roller display elements 34' corresponding to minor idler track rollers 34, and the appearance and layout or arrangement of these display elements corresponds to the appearance and to the layout or arrangement of the endless track and track rollers of the various track assemblies 30A-30B. This allows an operator to visually relate graphical representations 30A'-30D', and the various endless track and track roller display elements, to the corresponding track assemblies 30A-30D, including the various endless tracks and track rollers thereof.

Display elements 31', 32', 33', and 34' of the various graphical representations 30A', 30B', 30C', and 30D' are each adapted to issue the normal-mode stimulus for identifying a normal track roller lubricating oil level condition, and the low-mode stimulus for identifying a low track roller lubricating oil level condition. The normal-mode stimulus and the low-mode stimulus of each of display elements 31', 32', 33' and 34' are lights in or of display elements 31', 32', 33', and 34'. The normal-mode stimulus is a green light 200, and the low-mode stimulus is a red light 201, which is different from green light 200 to allow an operator to visually distinguish green light 200 from red light 201. Green and red lights 200 and 201 are part of the illuminated display of operator display 153, and may, in a particular embodiment, consist of LED lights including a green LED light for green light 200 and a red LED light for red light 201.

Sensor 74 of cap assembly 50 associated with drive track roller 31 of vehicle 20 relates to drive track roller display element 31' of operator display 153 graphical representation 30A' of drive track assembly 30A of vehicle 20. Sensor 74 is encoded with a signature that assigns sensor 74 to drive roller 31 of track assembly 30A of vehicle. The normal-mode and low-mode signals issued by sensor 74 are, in turn, encoded with the signature of sensor 74. Controller 152 of signal apparatus 151 is coupled to sensor 74 through bus 156 to receive the normal-mode and low-mode signals issued by sensor 74, and controller 152 is programmed to recognize the signature of the normal-mode and low-mode signals issued from sensor 74, and trigger or activate the corresponding drive roller display element 31' of graphical representation 30A' of track assembly 30A of vehicle 20 to issue the normal-mode stimulus from the normal-mode signal of sensor 74 and to issue the low-mode stimulus from the low-mode signal of sensor 74.

In response to sensor 74 sensing the presence of lubricating oil, sensor 74 issues its normal-mode signal to controller 152 through bus 156. Controller 152 is coupled to bus 156 to receive this normal-mode signal from sensor 74, which is encoded with the signature related to sensor 74. In response to receiving the normal-mode signal from sensor 74, controller 152 processes the normal-mode signal, recognizes the normal-mode signal and the encoded signature thereof corresponding to drive roller 31 of track assembly 30A of vehicle, and then triggers green light 200 of drive roller display element 31' of graphical representation 30A' related to track assembly 30A of vehicle 20. The triggering of green light 200 causes green light 200 to illuminate green light, which is a state of illumination and which constitutes the normal-mode stimulus and which is designed to indicate a normal lubricating oil level condition in reservoir 60 of drive roller 31 of track assembly 30A of vehicle 20, in accordance with the principle of the invention. As long as sensor 74 senses the presence of lubricating oil, it persistently issues the normal-mode signal causing controller 152 to persistently trigger display element 31' to illuminate green light 200. In other words, green light 200 remains illuminated as long as sensor 74 senses the presence of lubricating oil, which alerts or inform an operator of vehicle 20 of such a normal lubricating oil level condition in reservoir 60 of drive track roller 31 to indicate to such an operator that the track roller 31 has the recommended or sufficient volume of lubricating oil to properly lubricate track roller 31. Should sensor 74 stop issuing its normal-mode signal, controller 152 is responsive and deactivates green light 200 of drive track roller display element 31' of graphical representation 30A' thereby deactivating the normal-mode stimulus related to drive track roller display element 31'.

In response to sensor 74 sensing the non-presence of lubricating oil, sensor 74 issues its low-mode signal to controller 152 through bus 156. Controller 152 is coupled to bus 156 to receive this low-mode signal from sensor 74, which is encoded with the signature related to sensor 74. In response to receiving the low-mode signal from sensor 74, controller 152 processes the low-mode signal, recognizes the low-mode signal and the encoded signature thereof corresponding to drive roller 31 of track assembly 30A of vehicle, and then triggers red light 201 of drive roller display element 31' of graphical representation 30A' related to track assembly 30A of vehicle 20. The triggering of red light 201 causes red light 201 to illuminate red light, which is a state of illumination that is different from normal-mode stimulus state of illumination and which constitutes the low-mode stimulus and which is designed to indicate a low lubricating oil level condition in reservoir 60 of drive roller 31 of track assembly 30A of vehicle 20, in accordance with the principle of the invention. As long as sensor 74 senses the non-presence of lubricating oil, it persistently issues the low-mode signal causing controller 152 to persistently trigger display element 31' to illuminate red light 201. In other words, red light 201 remains illuminated as long as sensor 74 senses the non-presence of lubricating oil, which alerts or inform an operator of vehicle 20 of such a low lubricating oil level condition in reservoir 60 of drive track roller 31 to indicate to such an operator that the track roller 31 does not have the recommended or sufficient volume of lubricating oil to properly lubricate track roller 31. Should sensor 74 stop issuing its low-mode signal, controller 152 is responsive and deactivates red light 201 of drive track roller display element 31' of graphical representation 30A' thereby deactivating the low-mode stimulus related to drive track roller display element 31'.

The process of system 150 described above in connection with cap assembly 50 and drive track roller 31 of sensor 74 issuing the encoded normal-mode and low-mode signals from sensor 74 and signal apparatus receiving and triggering normal-mode and low-mode stimuli of the corresponding display element of operator display 153 in conjunction with cap assembly 50 of drive track roller 31 applies in every respect to each of the cap assemblies of each of the track rollers of each of track assemblies 30A-30D of vehicle 20. And so simply by looking at operator display 153, an operator can be quickly visually informed of the oil level conditions of the various track rollers of the various track assemblies 30A-30D of vehicle 20 and quickly identify which of the various track rollers have a normal lubricating oil level condition and which of the various track rollers have a low lubricating oil level condition. To ensure the oil level readings by the various sensors of the cap assemblies of the various track rollers are accurate, it is to be noted that vehicle 20 should be resting on level or near level ground. In the present embodiment, operator display 153 is applied exteriorly to chassis 22 of vehicle 20 under operator cab 21 so as to be accessible for viewing by an operator from outside vehicle 20, such as by an operator standing on the ground beside vehicle 20. Operator display 153 can be located elsewhere for convenient viewing, including inside operator cab 21, if so desired. Moreover, operator display 153 can, in a particular embodiment, be incorporated into a wireless device, such as a tablet computer or other wireless device or internet appliance, and wirelessly coupled in a conventional manner to controller 152 so as to wirelessly receive sensor signals. In yet another embodiment, signal apparatus 151 may, as a whole, be formed as a wireless device wireless coupled to serial bus 156 so as to wireless receive sensor signals.

Figure 9:
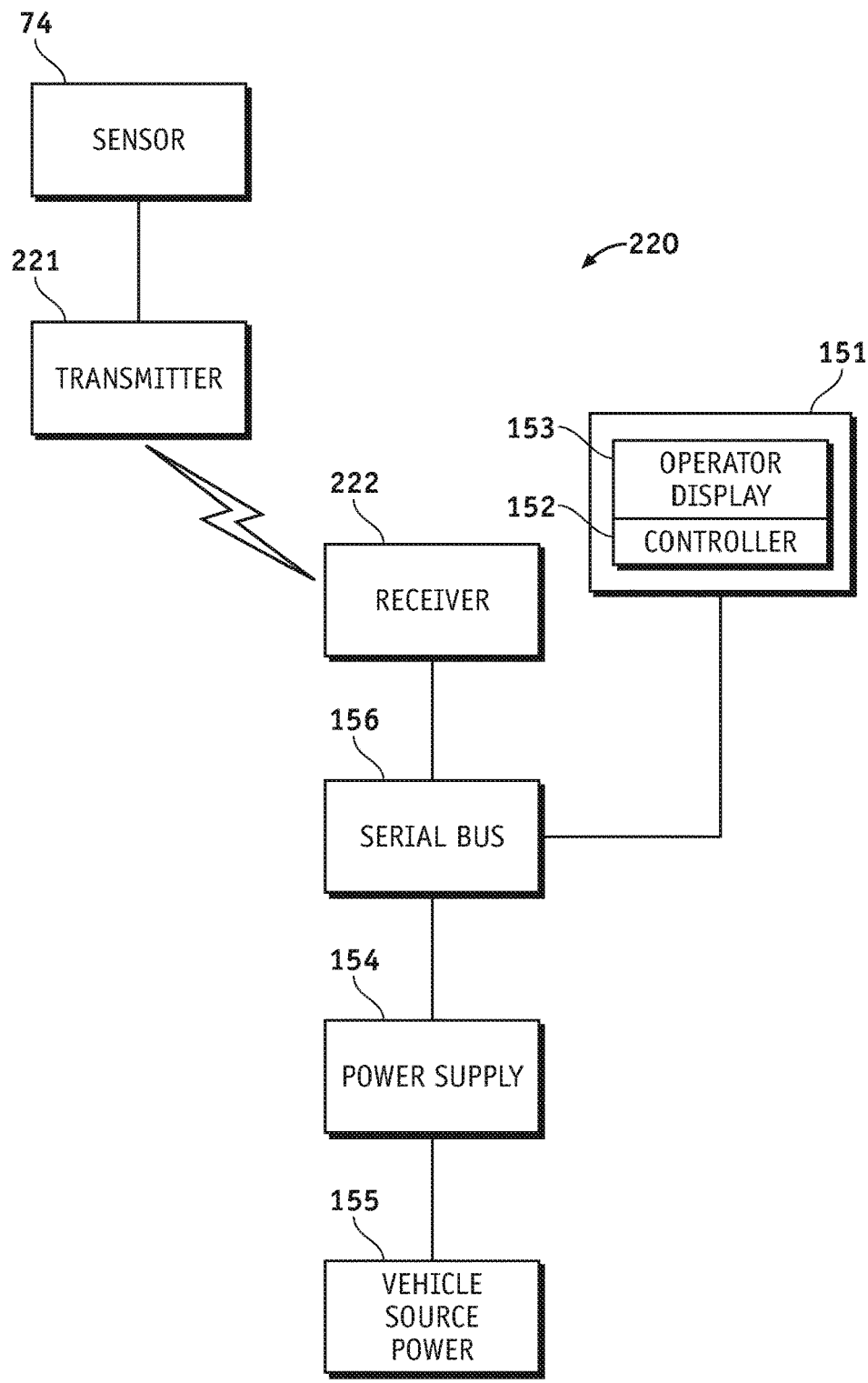
FIG. 9 is a highly generalized block diagram of an alternate embodiment of an oil level monitoring system constructed and arranged in accordance with the principle of the invention.

In the discussion of system 150 above in connection with cap assembly 50 of drive track roller 31, there is a "hard" or "wired" electrical connecting architecture that electrically connects sensor 74 to bus 156. In an alternate embodiment, this "hard" or "wired" electrical connecting architecture between sensor 74 and bus 156 can be replaced by a wireless coupling provided by a transmitter wirelessly coupled to a receiver coupled between sensor 74 and bus 156. To illustrate this, FIG. 9 is a highly generalized block diagram of an alternate embodiment of an oil level monitoring system 220 constructed and arranged in accordance with the principle of the invention. In common with system 150, system 220 shares sensor 74, signal apparatus 151, including operator display 153 and controller 152, electrically connected to bus 156, and power supply 154 electrically connected between vehicle source power 155 and bus 156. In system 220, a wireless transmitter 221 is electrically connected to sensor 74, a corresponding wireless receiver 222 is electrically connected to bus 156, and transmitter 221 is wireless coupled in signal communication to receiver 222. In system 220, transmitter 221 wirelessly transmits normal-mode and low-mode signals from sensor 74 to receiver 222, which, in turn, relays the normal-mode and low-mode signals to signal apparatus 151 through bus 156 for processing in the manner described above in connection with system 150.

Figure 10:
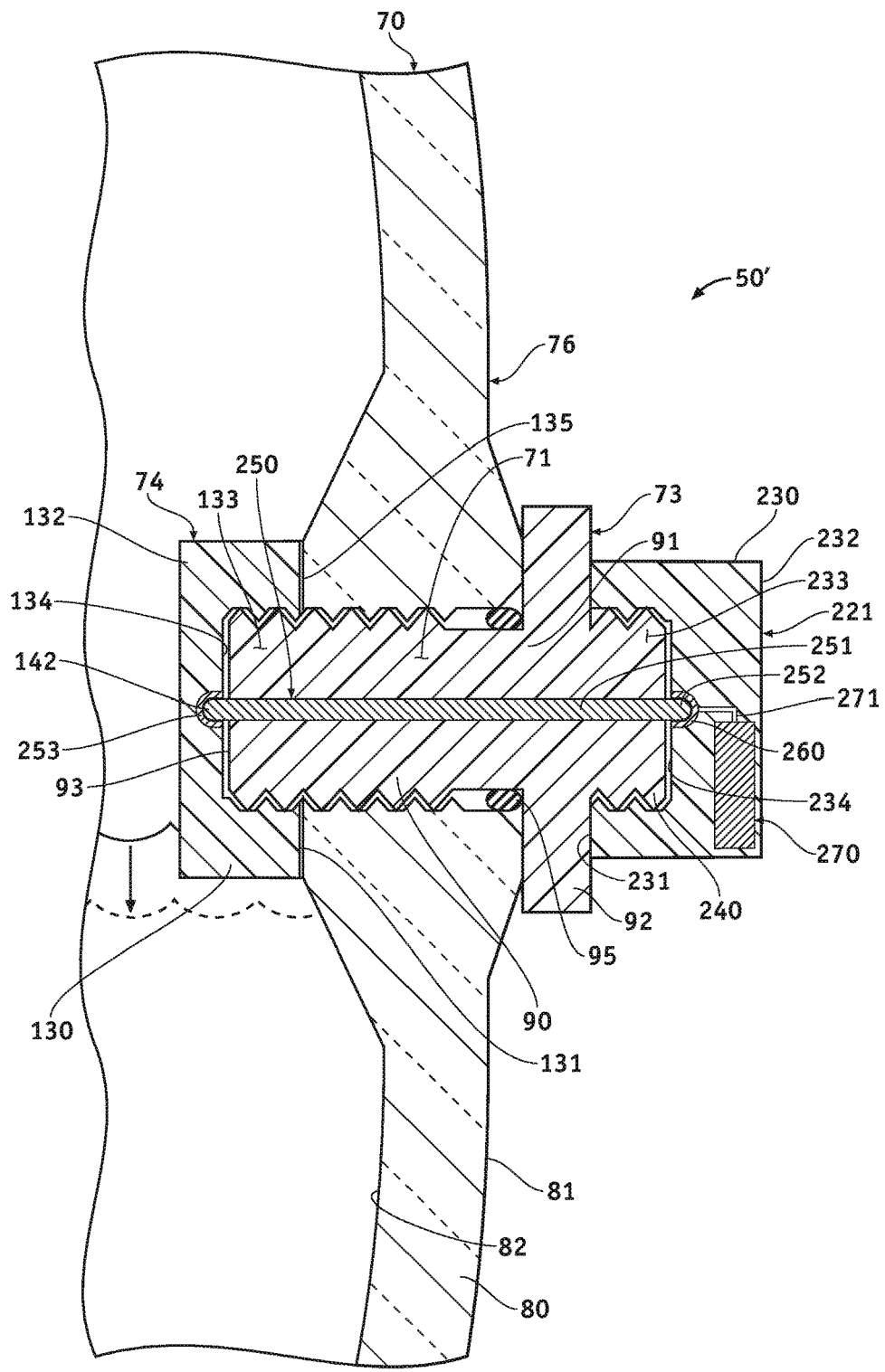
FIG. 10 is an enlarged, fragmented section view of a cap assembly including a cap formed with a lubricating oil maintenance port, a gasket, a plug used to open and close the port formed in the cap, and a sensor and a transmitter forming a part of the oil level monitoring system of FIG. 9.
Figure 11:
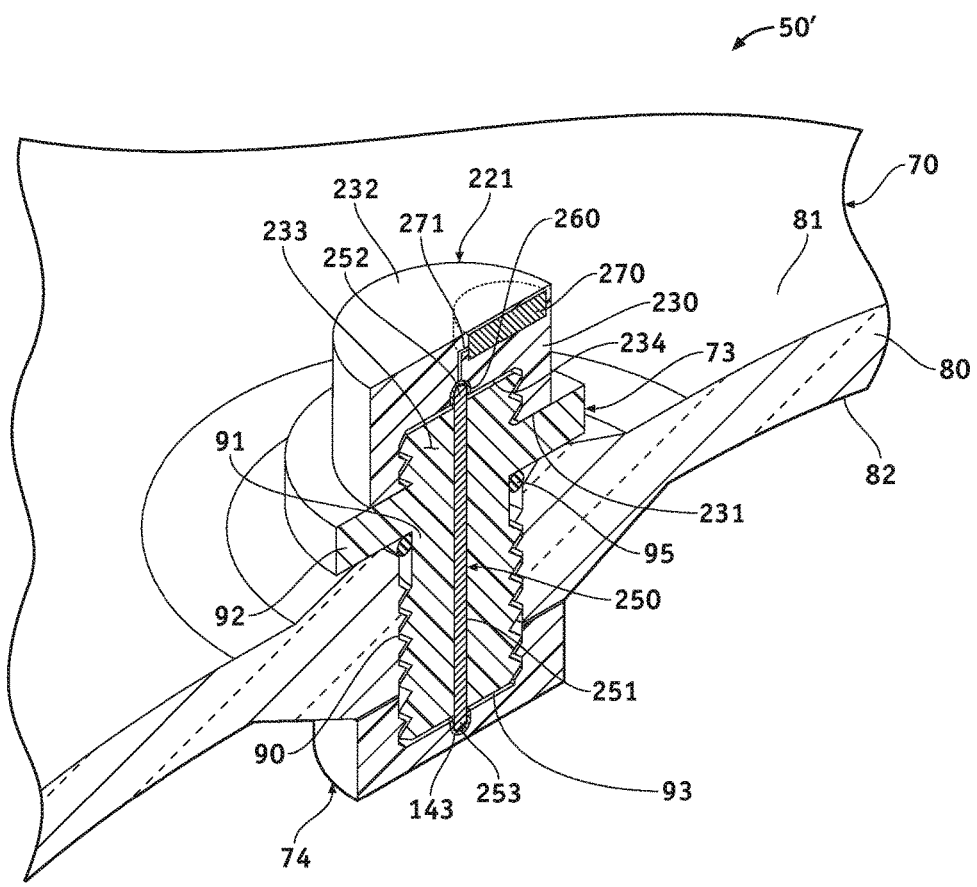
FIG. 11 is a perspective section view of the embodiment of FIG. 10.
Figure 12:
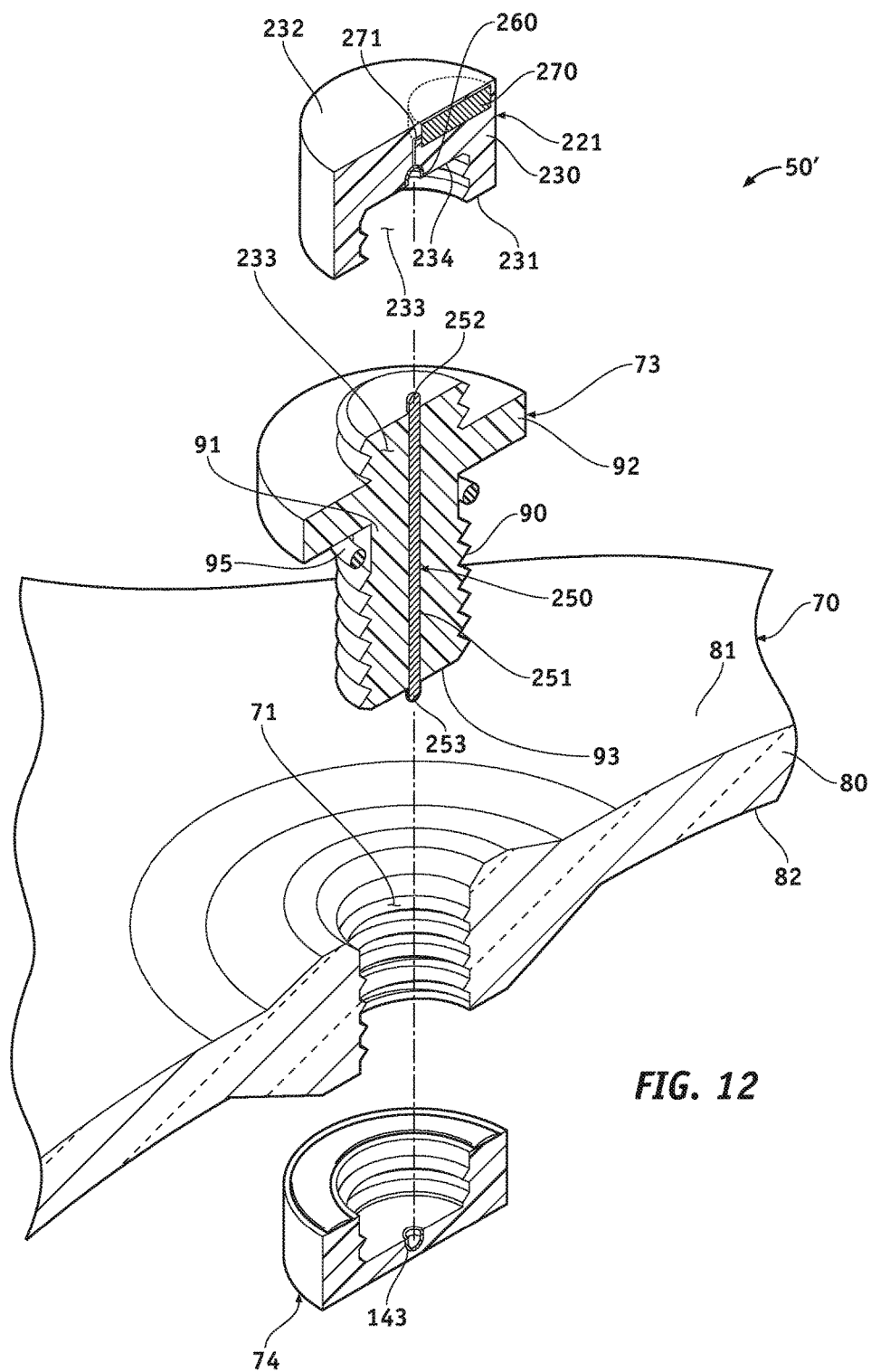
FIG. 12 is an exploded view of the embodiment of FIG. 11.

The implementation of the transmitter 221 and the receiver 222 of system 220 is implemented in a cap assembly as shown in FIGS. 10-12 and which is denoted by the reference character 50'. In common with cap assembly 50 discussed above, cap assembly 50' is identical in every respect and shares cap 70 formed with port 71 that extends through sealing body 80 from outer side or face 81 to inner side or face 82, plug 73 used to open and closed port 71, and sensor 74. Like cap assembly 50, plug 73 of cap assembly 50' includes threaded post 90, outer end or extremity 91 including head 92, inner end 93 that removably couples sensor 74, and also gasket 95. In cap assembly 50', transmitter 221 is attached to outer end or extremity 91 of plug 73 and is operatively coupled to sensor 74 applied to inner end 93 of plug 73.

As discussed above in connection with system 150, sensor 74 is for sensing the presence of lubricating oil in response to sensor 74 touching volume 110 of lubricating oil 11 in lubricating oil reservoir 60 as shown in FIG. 10 when volume 110 of lubricating oil 111 is sufficient to fill reservoir 60 to recommended oil level 120, and for sensing the non-presence of lubricating oil in response to sensor 74 not touching volume 110 of lubricating oil 11 in reservoir 60 when volume 110 of lubricating oil 11 is insufficient to fill reservoir 60 to recommended oil level 120, such as when volume 110 of lubricating oil 111 fills reservoir 60 to low oil level 121. Transmitter 221 is operatively coupled to sensor 74 to receive normal-mode and low-mode signals from sensor 74. In response to sensor 74 sensing the presence of lubricating oil, sensor 74 issues its normal-mode signal to transmitter 221, which receives the normal-mode signal and wirelessly transmits the normal-mode signal to receiver 222 and which, in turn, receives the normal-mode signal from transmitter 221 and in response thereto relays the normal-mode signal to signal apparatus through bus 156 for processing the normal-mode signal for triggering signal apparatus 151 to issue the resulting normal-mode stimulus issued through operator display 153 for identifying a normal lubricating oil level condition. In response to sensor 74 sensing the non-presence of lubricating oil, sensor 74 issues its low-mode signal to transmitter 221, which receives the low-mode signal and wirelessly transmits the low-mode signal to receiver 222 and which, in turn, receives the low-mode signal from transmitter 221 and in response thereto relays the low-mode signal to signal apparatus 151 through bus 156 for processing the low-mode signal for triggering signal apparatus 151 to issue the resulting low-mode stimulus issued through operator display 153 for identifying a low lubricating oil level condition.

Transmitter 221 is a conventional radio-frequency transmitter, and receiver 222 is a conventional radio-frequency receiver. Transmitter 221 is adapted to be removably coupled to cap assembly 50', and is therefore considered to be a cap assembly-attachable transmitter. More specifically, transmitter 221 is configured to be removably coupled to plug 73 of cap assembly 50', and is therefore considered more specifically to be a plug-attachable transmitter, wherein plug 73 and transmitter 221 together form a transmitter-plug assembly in accordance with the principle of the invention.

In this embodiment, transmitter 220 is formed in the shape of a cylindrical body 230, which has opposed inner and outer ends 231 and 232. A blind bore 233 is formed in cylindrical body 230, which extends into cylindrical body 230 from inner end 231 and terminates at an end wall 234 within cylindrical body 230. Blind bore 233 is inwardly threaded and relates to an outwardly threaded location spigot 240 formed in head 92 of outer end or extremity 91 of plug 73 so as to be capable of being threaded onto location spigot 240 of outer end or extremity 91 of plug 73 to removably couple transmitter 221 to plug 73. To removably attach transmitter 221 to plug 73, cylindrical body 230 is threaded onto location spigot 240 of outer end or extremity 91 of plug 73 by applying location spigot 240 of plug 73 to blind bore 233 and then rotating cylindrical body 230 so as to threadably secure and tighten location spigot 240 of plug 73 into blind bore 233 and to draw and tighten inner end 231 of cylindrical body 230 against head 92 of outer end or extremity 91 of plug 73 so as to locate transmitter 221 alongside the outer side or face 81 of cap 70.

Inwardly threaded blind bore 233 complements outwardly threaded location spigot 230 of outer extremity 91 of plug 73, which together form an engagement assembly that removably couples or attaches transmitter 221 to plug 73. According to this disclosure, outwardly threaded location spigot 240 of plug 73 is exemplary of an engagement element of the engagement assembly removably coupling transmitter 221 to plug 73, and inwardly threaded blind bore 233 is exemplary of a complemental element of the engagement assembly removably coupling transmitter 221 to plug 73. In alternate embodiments, other forms of engagement assemblies may be formed between transmitter 221 and plug 73 to removably couple transmitter 221 to plug 73 without departing from the invention, such as a detent engagement pair, a key engagement pair, etc.

Plug 73 of cap assembly 50' is formed with a conductor structure denoted generally at 250, which operatively couples sensor 74 to transmitter 221. The operative coupling between sensor 74 and transmitter 21 is an electrical coupling and a signal communication coupling such that transmitter 221 is coupled to receive the normal-mode and low-mode signals from sensor 74. Conductor structure 250 is a conductive track or wire 251 that is formed of copper and that extends centrally through plug 73 from an outer contact 252 that protrudes outwardly from the geometric center of location spigot 240, to an inner contact 253 that protrudes outwardly from the geometric center of inner end 93 of plug 73. Outer contact 252 contacts and mates with a corresponding electrical contact 260 formed in endwall 234 of transmitter 221 removably coupled to location spigot 240 of outer end or extremity 91 of plug 73 and this electrically connects transmitter 221 to conductor structure 250 formed in plug 73, and inner contact 253 contacts and mates with electrical contact 143 formed in endwall 134 of sensor 74 removably coupled to inner end 93 of plug 73 and this electrically connects sensor 74 to conductor structure 138 formed in plug 73, whereby conductor structure 250 electrically connects sensor 74 to transmitter 221 and couples sensor 74 in signal communication to transmitter 221, which characterizes the operative coupling of sensor 74 to transmitter 221. Transmitter 221 is formed with an internal battery 270, which is electrically connected to contact 260 formed in transmitter 221 with wiring 271 formed in transmitter 221 between battery 270 and contact 260. Battery 270 is a 9-volt battery in the present embodiment, which powers transmitter 221 and which powers sensor 74 via the electrical connection between sensor 74 and transmitter 221. The assemblage sensor 74 and transmitter 221 onto plug 73 energizes both sensor 74 and 221 with electric power from battery 270, and operatively couples transmitter 221 to sensor 74 to receive normal-mode and low-mode signals from sensor 74. Again, in response to sensor 74 sensing the presence of lubricating oil, sensor 74 issues its normal-mode signal to transmitter 221 via conductor structure 250 formed in plug 73, which transmitter 221 receives the normal-mode signal and wirelessly transmits the normal-mode signal to receiver 222 and which, in turn, receives the normal-mode signal from transmitter 221 and in response thereto relays the normal-mode signal to signal apparatus 151 through bus 156 for processing the normal-mode signal for triggering signal apparatus 151 to issue the resulting normal-mode stimulus issued through operator display 153 for identifying a normal lubricating oil level condition. And again, in response to sensor 74 sensing the non-presence of lubricating oil, sensor 74 issues its low-mode signal to transmitter 221 via conductor structure 250 formed in plug 73, which transmitter 221 receives the low-mode signal and wirelessly transmits the low-mode signal to receiver 222 and which, in turn, receives the low-mode signal from transmitter 221 and in response thereto relays the low-mode signal to signal apparatus 151 through bus 156 for processing the low-mode signal for triggering signal apparatus 151 to issue the resulting low-mode stimulus issued through operator display 153 for identifying a low lubricating oil level condition.

Receiver 222 is conventionally wired to bus 156 with electrical wiring formed in vehicle 20, and is mounted to vehicle 20 at any desired location so as to promote a competent wireless coupling between transmitter 221 (not shown in FIG. 1) and receiver 222. As a matter of example, in FIG. 1 receiver 222 is shown as it would appear attached to the top of operator cab 21 of vehicle 20, and while this location is optimum and suitable for facilitating a competent wireless coupling between transmitter 221 and receiver 222, receiver 222 can be mounted at other locations along vehicle 20 as may be desired.

The various cap assemblies incorporated with the various track rollers of the various track assemblies 30A-30D may each be either cap assembly 50 related to system 150, or cap assembly 50' related to system 220 as both cap assembly iterations function identically with respect to signal apparatus 151 with the exception the sensor 74 of cap assembly 50 is operatively coupled to signal apparatus 151 with a "hard" or "wired" electrical connecting architecture formed between sensor 74 and signal apparatus 151 as described above, and that sensor 74 of cap assembly 50' is operatively coupled to signal apparatus 151 with a wireless connection/coupling facilitated by transmitter 221 and receiver 222 wirelessly coupling receiver 74 to signal apparatus 151.

The various embodiments of the invention herein specifically disclosed are discussed in connection with a lubricating oil reservoir of a roller of a tracked vehicle for maintaining a volume of lubricating oil for providing machine lubrication to the roller. Consistent with the teachings of the invention set forth throughout this specification, it is to be understood that the various embodiments of the invention may be carried out in connection with other forms of lubricating oil reservoirs that maintains a volume of a lubricating oil for providing machine lubrication, e.g., for providing machine lubrication to a piston assembly or other reciprocating mechanism, a pinion or other rotary mechanism, a differential or other gear assembly, etc.

In cap assemblies 50 and 50', sensor 74 is formed in the shape of cylindrical body 130 having opposed inner and outer ends 131 and 132 and a blind bore 133 that extends into cylindrical body 130 from inner end 131 and which terminates at end wall 134 within cylindrical body 130. As shown and described herein, blind bore 133 is inwardly threaded and relates to outwardly threaded inner end 93 of plug 73 so as to be capable of being threaded onto inner end 93 of plug 73 to removably couple sensor 74 to plug 73 so as to form a sensor-plug assembly. As previously described, to removably attach sensor 74 to plug 73, cylindrical body 130 is threaded onto inner end 93 of plug 73 by applying inner end 93 of plug 73 to blind bore 133 and then rotating cylindrical body 130 so as to threadably secure and tighten outer end 93 of plug 73 into blind bore 133 and to draw and tighten inner end 131 of cylindrical body 130 against the area of inner face 82 of cap 70 that encircles port 71. In cap assembly 50, conductive track 141 extends centrally through threaded post 90 to contact 143 that protrudes outwardly from the geometric center of inner end 93 of plug 73, and which contacts and mates with corresponding electrical contact 143 formed in endwall 134 of sensor 74 removably coupled to inner end 93 of plug 73, which electrically connects sensor 74 to conductor structure 138 formed in plug 73. In cap assembly 50', conductive track 251 extends centrally through threaded post 90 to contact 253 that protrudes outwardly from the geometric center of inner end 93 of plug 73, and which contacts and mates with corresponding electrical contact 143 formed in endwall 134 of sensor 74 removably coupled to inner end 93 of plug 73, which electrically connects sensor 74 to conductor structure 250 formed in plug 73. In both cap assemblies 50 and 50', adhesive denoted at 135 is applied between inner end 131 of cylindrical body 130 of sensor 74 and inner face 82 of cap 70, which adhesively adheres cylindrical body 130 to inner face 82 of cap 70. Again, this allows plug 73 to be threadably removed from port 71 and sensor 74 without sensor 74 detaching and falling away from cap 71, and sensor 74 may be initially adhesively applied to cap 70 with blind bore 133 aligned with port 71 as shown in FIG. 6, after which plug 73 may be threaded into port 71 and into blind bore 133 to secure plug 73 to port 71 and removably couple plug 73 to sensor 74.

Figure 13:
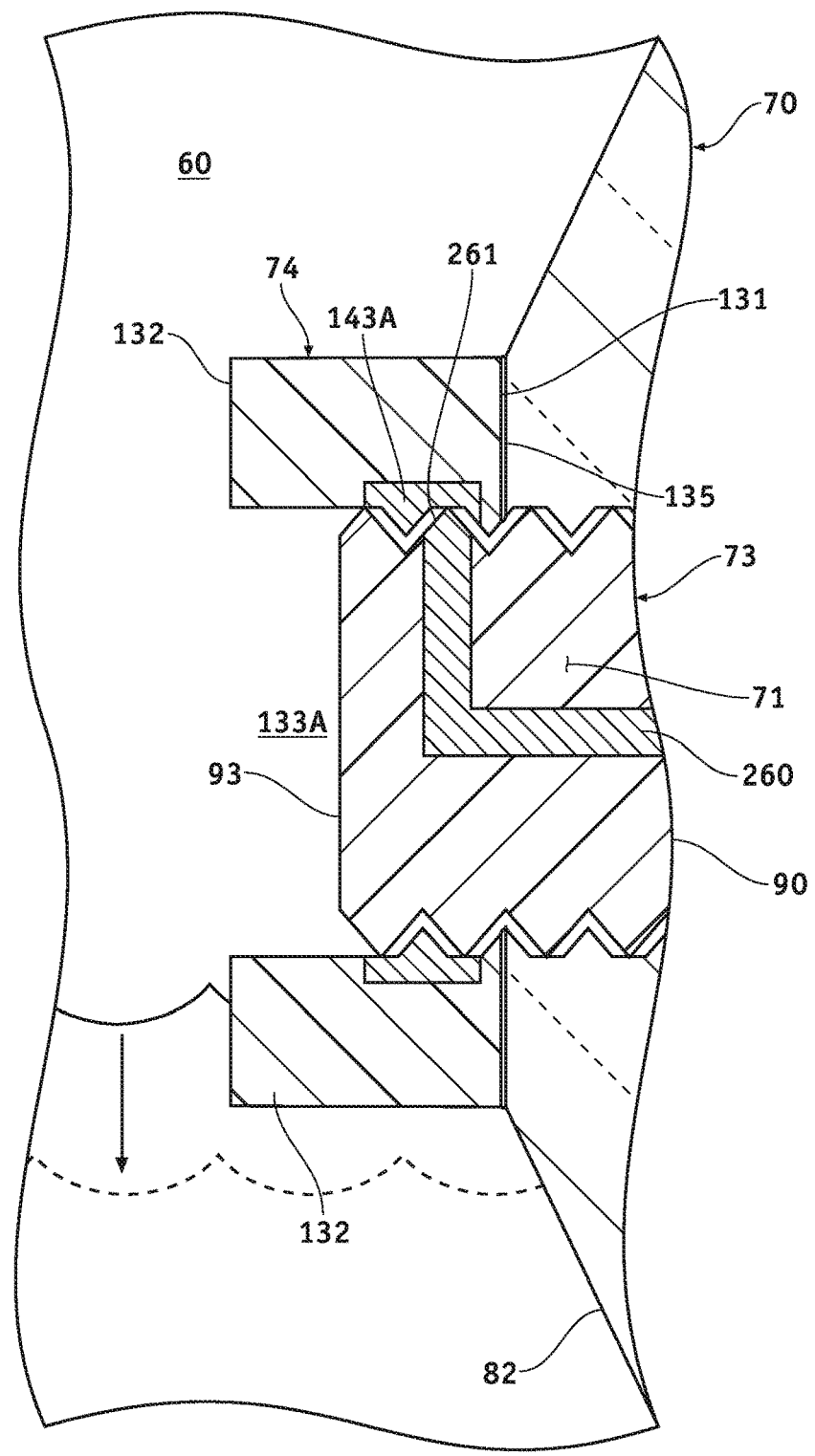
FIG. 13 is a highly generalized vertical section view of an alternate embodiment of a sensor-plug assembly of an attachable cap assembly constructed and arranged in accordance with the principle of the invention.

FIG. 13 is a highly generalized vertical section view of an alternate embodiment of a sensor-plug assembly of an attachable cap assembly constructed and arranged in accordance with the principle of the invention that may be used in cap assembly 50 and in cap assembly 50', if so desired. In FIG. 13, sensor 74 is formed in the shape of cylindrical body 130 having opposed inner and outer ends 131 and 132 and bore 133A that extends through cylindrical body 130 from inner end 131 to outer end 132. There is no endwall formed in outer end 132, and so outer end 132 is open and bore 133A is not blind. Bore 133A is inwardly threaded and relates to outwardly threaded inner end 93 of threaded post 90 of plug 73 so as to be capable of being threaded onto inner end 93 of plug 73 to removably couple sensor 74 to plug 73 so as to form the sensor-plug assembly embodiment depicted in FIG. 13. To removably attach sensor 74 to plug 73, cylindrical body 130 is threaded onto inner end 93 of plug 73 by applying inner end 93 of plug 73 to bore 133A and then rotating cylindrical body 130 so as to threadably secure and tighten outer end 93 of plug 73 into bore 133A and to draw and tighten inner end 131 of cylindrical body 130 against the area of inner face 82 of cap 70 that encircles port 71.

In FIG. 13, the conductive track 141 of cap assembly 50 and the conductive track 151 of cap assembly 50' is replaced with conductive track 260. Conductive track 260 extends through threaded post 90 and is out-turned to a contact 261 at the outer or outward threads of threaded post 90 near inner end 93 of threaded post 90, and which contacts and mates with a corresponding annular electrical contact 143A formed at the threads of threaded bore 133A of sensor 74 removably coupled via threading to inner end 93 of plug 73, which electrically connects sensor 74 to conductor structure 260 formed in plug 73. Adhesive denoted at 135 is applied between inner end 131 of cylindrical body 130 of sensor 74 and inner face 82 of cap 70, which adhesively adheres cylindrical body 130 to inner face 82 of cap 70 in the embodiment of FIG. 13, and this allows plug 73 to be threadably removed from port 71 and sensor 74 without sensor 74 detaching and falling away from cap 71, and sensor 74 may be initially adhesively applied to cap 70 with bore 133 aligned with port 71 if so desired, after which plug 73 may be threaded into port 71 and into bore 133A to secure plug 73 to port 71 and removably couple plug 73 to sensor 74 in the embodiment of FIG. 13. Because outer end 132 is open in the embodiment of FIG. 13, bore 133A is open to bore 133A is open to reservoir 60. As such, with sensor 74 adhesively adhered to inner face 82 of cap 70 in the embodiment of FIG. 13, reservoir 60 may be serviced in the form of lubricating oil replenishment or adjustment through port 71 and bore 133A when plug 73 is removed from port 71 and sensor 74.

The present invention is described above with reference to preferred embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A cap assembly, comprising:
a cap, the cap is for closing an open end of a reservoir and includes an outer side, an inner side, a port that extends through the cap from the outer side to the inner side, and a sensor juxtaposed to the inner side;
the port is closed by a plug removably coupled to the port, the plug includes an inner end adjacent to the inner side of the cap, an outer end adjacent to the outer side of the cap, a wireless transmitter carried by the outer end, and a conductor structure, the conductor structure operatively couples the sensor to the wireless transmitter; and
the wireless transmitter is for transmitting a wireless signal, when the sensor issues a signal to the wireless transmitter.

2. The cap assembly according to claim 1, wherein the sensor includes:
an inner end;
an outer end;
a bore, the bore extends through the sensor from the inner end to the outer end, and is formed with a sensor contact;
the inner end of the plug is threaded to the bore through the inner end of the sensor; and
the sensor is electrically connected to the conductor structure via the sensor contact.

3. The cap assembly according to claim 1, wherein the sensor is adhesively adhered to the lubricating oil engaging side of the cap.

4. The cap assembly according to claim 1, wherein the wireless transmitter is threaded to the outer end of the plug.

5. The cap assembly according to claim 4, wherein the outer end of the plug is formed with a location spigot, and the wireless transmitter is threaded to the location spigot.

6. The cap assembly according to claim 1, further comprising a battery for powering the sensor and the wireless transmitter.

7. The cap assembly according to claim 6, wherein the battery is formed with the transmitter.

8. The cap assembly according to claim 6, wherein the conductor structure electrically connects the sensor to the battery.

9. A cap assembly, comprising:
a cap, the cap is for closing an open end of a reservoir and includes an outer side, an inner side, a port that extends through the cap from the outer side to the inner side, and a sensor juxtaposed to the inner side
the port is closed by a plug removably coupled to the port, the plug includes an inner end adjacent to the inner side of the cap, an outer end adjacent to the outer side of the cap, a wireless transmitter carried by the outer end, and a conductor structure, the conductor structure operatively couples the sensor to the wireless transmitter;
the conductor structure includes a conductive track, the conductive track extends through the plug from an inner contact proximate to the inner end of the plug to an outer contact proximate to the outer end of the plug;
the sensor is electrically connected to the conductive track via the inner contact;
the wireless transmitter is electrically connected to the conductive track via the outer contact;
the wireless transmitter is for transmitting a wireless signal, when the sensor issues a signal to the wireless transmitter.

10. The cap assembly according to claim 9, wherein the sensor includes:
an inner end;
an outer end;
a bore, the bore extends through the sensor from the inner end to the outer end, and is formed with a sensor contact;
the inner end of the plug is threaded to the bore through the inner end of the sensor; and
the sensor is electrically connected to the conductor structure via the sensor contact.

11. The cap assembly according to claim 9, wherein the sensor is adhesively adhered to the lubricating oil engaging side of the cap.

12. The cap assembly according to claim 9, wherein the wireless transmitter is threaded to the outer end of the plug.

13. The cap assembly according to claim 12, wherein the outer end of the plug is formed with a location spigot, and the wireless transmitter is threaded to the location spigot.

14. The cap assembly according to claim 9, further comprising a battery for powering the sensor and the wireless transmitter.

15. The cap assembly according to claim 14, wherein the battery is formed with the transmitter.

16. The cap assembly according to claim 14, wherein the conductor structure electrically connects the sensor to the battery.

* * * * *